United States Patent
Sakurabu

(10) Patent No.: US 9,602,717 B2
(45) Date of Patent: Mar. 21, 2017

(54) IMAGE CAPTURE DEVICE AND FOCUS CONTROL METHOD

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/011,993

(22) Filed: Feb. 1, 2016

(65) Prior Publication Data

US 2016/0150153 A1    May 26, 2016

Related U.S. Application Data

(63) Continuation of application No. PCT/JP2014/066385, filed on Jun. 20, 2014.

(30) Foreign Application Priority Data

Sep. 5, 2013 (JP) .................................. 2013-184167

(51) Int. Cl.
*H04N 5/232* (2006.01)
*G03B 13/00* (2006.01)
(Continued)

(52) U.S. Cl.
CPC ........... *H04N 5/23212* (2013.01); *G02B 7/28* (2013.01); *G02B 7/285* (2013.01); *G02B 7/34* (2013.01); *G02B 7/36* (2013.01); *H04N 5/3696* (2013.01)

(58) Field of Classification Search
CPC .... H04N 5/23212; H04N 5/3696; G02B 7/28; G02B 7/285; G02B 7/34; G02B 7/36
(Continued)

(56) References Cited

U.S. PATENT DOCUMENTS

2008/0025717 A1*  1/2008  Kawanishi ............. G02B 7/102
                                                    396/128
2010/0150538 A1*  6/2010  Ono ....................... G03B 13/00
                                                    396/104
(Continued)

FOREIGN PATENT DOCUMENTS

JP          9-258090 A     10/1997
JP          2013-37101 A    2/2013
(Continued)

OTHER PUBLICATIONS

International Preliminary Report on Patentability for PCT/JP2014/066385 (PCT/IPEA/409) dated Oct. 2, 2015.
(Continued)

*Primary Examiner* — Sinh Tran
*Assistant Examiner* — Zhenzhen Wu
(74) *Attorney, Agent, or Firm* — Birch, Stewart, Kolasch & Birch, LLP

(57) ABSTRACT

Provided are an image capture device and a focus control method capable of performing auto-focus (AF) at high speed by reducing time until a focus control is completed even when a focus control based on a phase difference AF method and a focus control based on a contrast AF method are used in combination. A digital camera performs a correlation operation of two images captured by a pixel pair P1, performs a correlation operation of two images captured by a pixel pair P2, and determines reliability of correlation operation results based on information generated from the two correlation operation results. When the reliability is low, the digital camera performs the contrast AF. Here, the digital camera variably controls a movement step (arbitrary distance) when moving a focus lens in a predetermined range to calculate a contrast value, according to the height of the reliability.

18 Claims, 19 Drawing Sheets

(51) Int. Cl.
    *G02B 7/28*      (2006.01)
    *G02B 7/34*      (2006.01)
    *G02B 7/36*      (2006.01)
    *H04N 5/369*     (2011.01)

(58) Field of Classification Search
    USPC ........ 348/345, 348, 349, 353, 354, 355, 356
    See application file for complete search history.

(56) References Cited

U.S. PATENT DOCUMENTS

| | | | | |
|---|---|---|---|---|
| 2012/0169917 A1* | 7/2012 | Isobe | ................ | G02B 7/08 348/345 |
| 2013/0242172 A1* | 9/2013 | Hamano | ............ | H04N 5/23212 348/349 |
| 2015/0312471 A1* | 10/2015 | Kosaka | .............. | H04N 5/23212 348/345 |

FOREIGN PATENT DOCUMENTS

| | | | |
|---|---|---|---|
| JP | 2014-16569 A | 2/2013 |
| JP | 2013-61579 A | 4/2013 |

OTHER PUBLICATIONS

International Search Report for PCT/JP2014/066385 (PCT/ISA/210) mailed on Sep. 30, 2014.
Written Opinion of the International Preliminary Examining Authority for PCT/JP2014/066385 (PCT/IPEA/408) mailed on May 19, 2015.
Written Opinion of the International Searching Authority for PCT/JP2014/066385 (PCT/ISA/237) mailed on Sep. 30, 2014.

\* cited by examiner

IMAGE CAPTURE DEVICE AND FOCUS CONTROL METHOD

CROSS-REFERENCE TO RELATED APPLICATIONS

This application is a Continuation of PCT International Application No. PCT/JP2014/066385 filed on Jun. 20, 2014, which claims priority under 35 U.S.C §119 (a) to Japanese Patent Application No. 2013-184167 filed on Sep. 5, 2013. Each of the above application(s) is hereby expressly incorporated by reference, in its entirety, into the present application.

BACKGROUND OF THE INVENTION

1. Field of the Invention

The present invention relates to an image capture device and a focus control method.

2. Description of the Related Art

In recent years, according to increase in resolution of a solid-state imaging element such as a charge coupled device (CCD) image sensor or a complementary metal oxide semiconductor (CMOS) image sensor, demand for an information device having an imaging function, such as a digital still camera, a digital video camera, a mobile phone such as a smart phone, or a personal digital assistant (PDA) has rapidly increased. The information device having the above-mentioned imaging function is referred to as an image capture device.

In such an image capture device, as a focus control method of focusing on a main subject, a contrast auto-focus (AF) method or a phase difference AF method is employed. Since the contrast AF method and the phase difference AF method have advantages of their own, an image capture device using both the methods in combination has been also provided (for example, see JP2013-61579A).

JP2013-61579A discloses an image capture device that performs a focus control by the contrast AF method when a defocus amount cannot be calculated by the phase difference AF method or when reliability of the defocus amount is low even though the defocus amount can be calculated.

SUMMARY OF THE INVENTION

However, as disclosed in JP2013-61579A, in a case where the defocus amount is calculated by the phase difference AF method and the focus control based on the contrast AF method is performed according to the reliability of the defocus amount, time until the focus control is completed becomes long, compared with a case where the focus control based on the contrast AF is performed from the beginning.

In order to solve the above problems, an object of the invention is to provide an image capture device and a focus control method capable of performing AF at high speed by reducing time until a focus control is completed even when a focus control based on a phase difference AF method and a focus control based on a contrast AF method are used in combination.

According to an aspect of the invention, there is provided an image capture device that includes an imaging element that images a subject through an imaging optical system including a focus lens, in which the imaging element includes a first signal detection unit that detects a signal based on one beam among a pair of beams that passes through different portions in a pupil region of the imaging optical system, and a second signal detection unit that detects a signal based on the other beam among the pair of beams, and the image capture device includes: a focus control unit that performs any one of a first focus control for moving the focus lens to a focusing position determined based on detection signals of the first signal detection unit and the second signal detection unit and a second focus control for moving the focus lens along an optical axis direction by an arbitrary distance in a predetermined movement range and moving the focus lens to a focusing position determined based on contrast of images captured by the imaging element at respective movement positions; a focus control determination unit that determines which one of the first focus control and the second focus control is to be performed based on information generated using the detection signals of the first signal detection unit and the second signal detection unit; and a control unit that variably controls, in the case where it is determined that the second focus control is to be performed, at least the arbitrary distance, among the movement range and the arbitrary distance in the movement range, based on the information.

According to another aspect of the invention, there is provided a focus control method in an image capture device that includes an imaging element that images a subject through an imaging optical system including a focus lens, in which the imaging element includes a first signal detection unit that detects a signal based on one beam among a pair of beams that passes through different portions in a pupil region of the imaging optical system, and a second signal detection unit that detects a signal based on the other beam among the pair of beams, and the focus control method includes: a focus control step of performing any one of a first focus control for moving the focus lens to a focusing position determined based on detection signals of the first signal detection unit and the second signal detection unit and a second focus control for moving the focus lens along an optical axis direction by an arbitrary distance in a predetermined movement range and moving the focus lens to a focusing position determined based on contrast of images captured by the imaging element at respective movement positions; a focus control determination step of determining which one of the first focus control and the second focus control is to be performed based on information generated using the detection signals of the first signal detection unit and the second signal detection unit; and a control step of variably controlling, in the case where it is determined that the second focus control is to be performed, at least the arbitrary distance, among the movement range and the arbitrary distance in the movement range, based on the information.

According to the invention, it is possible to provide an image capture device and a focus control method capable of performing AF at high speed by reducing time until a focus control is completed even in the case where a focus control based on a phase difference AF method and a focus control based on a contrast AF method are used in combination.

DESCRIPTION OF THE PREFERRED EMBODIMENTS

Hereinafter, embodiments of the invention will be described with reference to the accompanying drawings.

Figure 1:
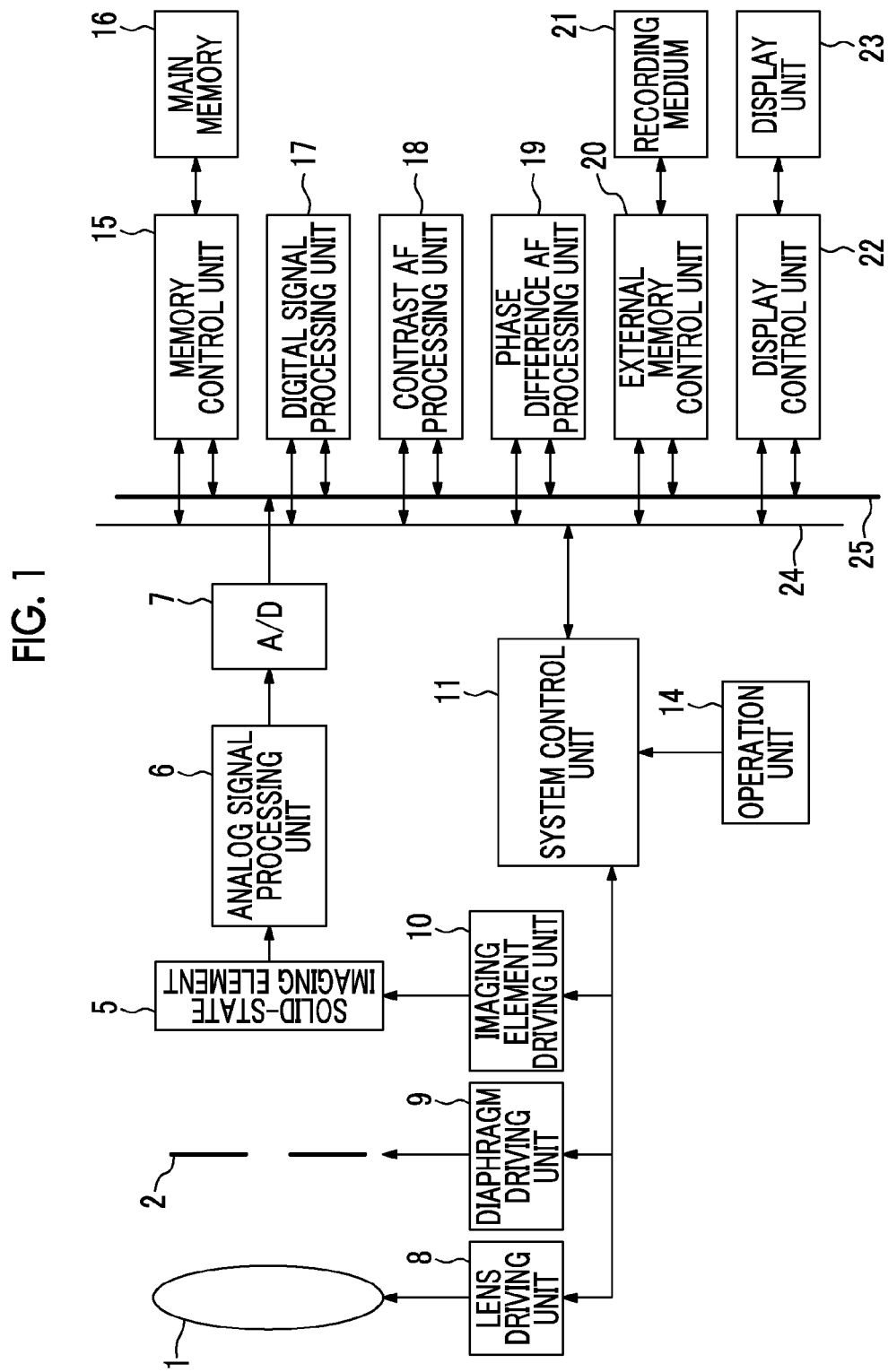
FIG. 1 is a diagram illustrating a schematic configuration of a digital camera which is an example of an image capture device illustrating an embodiment of the invention.

FIG. 1 is a diagram illustrating a schematic configuration of a digital camera which is an example of an image capture device for describing a first embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system. The lens device may be detachably mounted to a camera main body, or may be fixed thereto. It is sufficient if the imaging lens 1 includes at least the focus lens. Further, a single focus lens that performs focus adjustment by moving the entirety of the lens system may be used.

The camera main body includes a solid-state imaging element 5 of a CCD type, a CMOS type, or the like that images a subject through the lens device, an analog signal processing unit 6 that is connected to an output end of the solid-state imaging element 5 and performs analog signal processing such as a correlated double sampling process, and an A/D conversion circuit 7 that converts an analog signal output from the analog signal processing unit 6 into a digital signal. The analog signal processing unit 6 and the A/D conversion circuit 7 are controlled by a system control unit 11. The analog signal processing unit 6 and the A/D conversion circuit 7 may be built in the solid-state imaging element 5.

The system control unit 11 that generally controls the entirety of an electric control system of the digital camera controls a lens driving unit 8 to adjust the position of the focus lens included in the imaging lens 1, or to adjust the position of the zoom lens included in the imaging lens 1. Further, the system control unit 11 controls the degree of opening of the diaphragm 2 through a diaphragm driving unit 9 to adjust a light exposure value.

Further, the system control unit 11 drives the solid-state imaging element 5 through an imaging element driving unit 10, and outputs a subject image captured through the imaging lens 1 as a captured image signal. An instruction signal from a user is input to the system control unit 11 through an operation unit 14.

The system control unit 11 selects any one of a contrast AF processing unit 18 and a phase difference AF processing unit 19, and moves the focus lens to a focusing position determined by the selected processing unit, as described later.

Further, the electric control system of the digital camera includes a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, the contrast AF processing unit 18 that determines a focusing position according to a contrast AF method, the phase difference AF processing unit 19 that determines a focusing position according to a phase difference AF method, an external memory control unit 20 to which a detachable recording medium 21 is connected, and a display control unit 22 to which a display unit 23 mounted on a rear surface or the like of the camera is connected.

The memory control unit 15, the digital signal processing unit 17, the contrast AF processing unit 18, the phase difference AF processing unit 19, the external memory control unit 20, and the display control unit 22 are connected to each other through a control bus 24 and a data bus 25, and are controlled by instructions from the system control unit 11.

Figure 2:
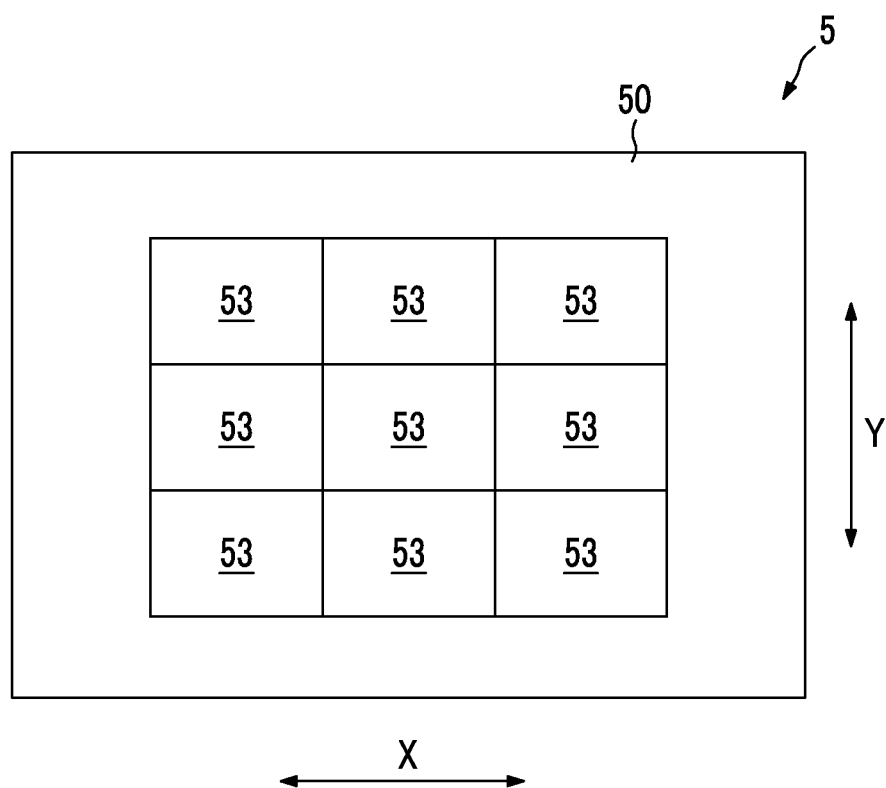
FIG. 2 is a schematic plan view illustrating an overall configuration of a solid-state imaging element 5 mounted on the digital camera shown in FIG. 1.

FIG. 2 is a schematic plan view illustrating an overall configuration of the solid-state imaging element 5 mounted on the digital camera shown in FIG. 1.

The solid-state imaging element 5 includes a light receiving surface 50 on which multiple pixels which are arranged in a two-dimensional pattern in a row direction X and in a column direction Y orthogonal to the row direction X are disposed. Nine AF areas 53 which are target areas for focusing are provided in the light receiving surface 50 in the example of FIG. 2.

The AF area 53 is an area that includes an image pickup pixel and a phase difference detection pixel as pixels.

In a portion where the AF areas 53 are excluded on the light receiving surface 50, only image pickup pixels are disposed. The AF areas 53 may be provided on the light receiving surface 50 without a gap.

Figure 3:
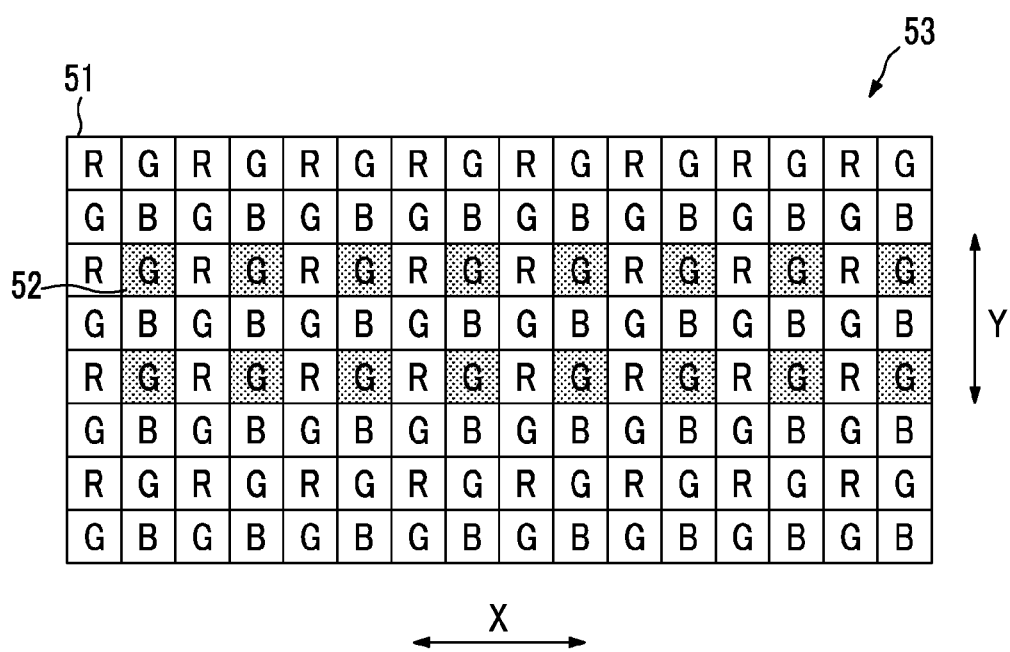
FIG. 3 is a partially enlarged view of a single AF area 53 shown in FIG. 2.

FIG. 3 is a partially enlarged view of a single AF area 53 shown in FIG. 2.

Pixels 51 are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The array of the color filters is a Bayer array over the entirety of the light receiving surface 50.

In the AF area 53, a part of the G pixels 51 (shaded pixels 51 in FIG. 3) are used as the phase difference detection pixels 52. In the example of FIG. 3, each G pixel 51 in an arbitrary pixel row among pixel rows including the R pixels 51 and the G pixels 51, and the G pixel 51 closest to each G pixel 51 in the column direction Y are used as the phase difference detection pixel 52. Here, as shown in FIG. 3, one direction in the two-dimensional array is defined as the X direction or the row direction, and the other direction is defined as the Y direction or the column direction.

Figure 4:
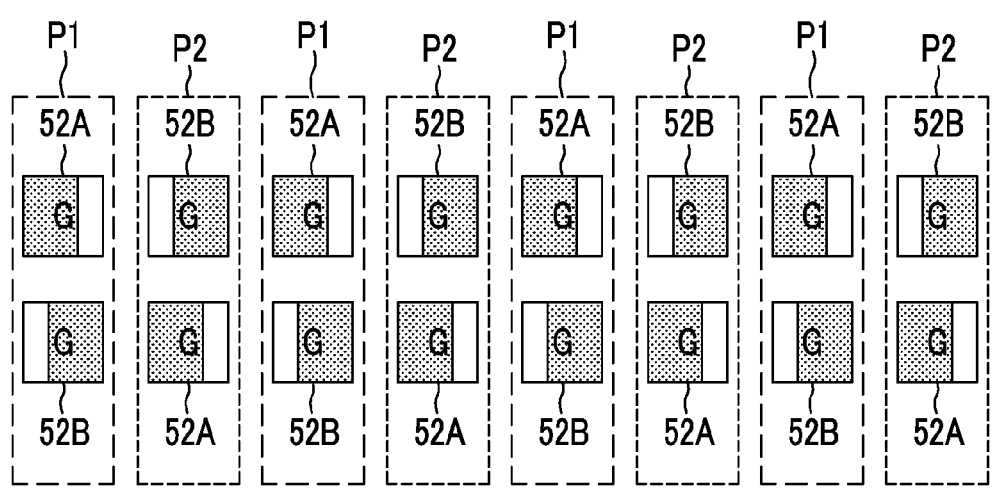
FIG. 4 is a diagram illustrating only a phase difference detection pixel 52 shown in FIG. 3.

FIG. 4 is a diagram illustrating only the phase difference detection pixels 52 shown in FIG. 3.

As shown in FIG. 4, the phase difference detection pixels 52 include two types of phase difference detection pixels 52A and phase difference detection pixels 52B.

The phase difference detection pixel 52A is a signal detection unit (first signal detection unit) that receives one beam among a pair of beams that passes through different portions in a pupil region of the imaging lens 1, and detects a signal depending on the intensity of received light.

The phase difference detection pixel 52B is a signal detection unit (second signal detection unit) that receives the other beam among the pair of beams, and detects a signal depending on the intensity of received light.

In the AF area 53, plural pixels 51 other than the phase difference detection pixels 52A and 52B are imaging pixels, and each imaging pixel receives the pair of beams that passes through the imaging lens 1, and detects a signal depending on the intensity of received light.

A light shielding film is provided above the photoelectric conversion unit of each pixel 51, and an opening for defining a light receiving area of the photoelectric conversion unit is formed on the light shielding film.

The center of the opening of the imaging pixel 51 matches the center of the photoelectric conversion unit of the imaging pixel 51. On the other hand, the center of the opening (outline portion in FIG. 4) of the phase difference detection pixel 52A is eccentric rightward with respect to the center of the photoelectric conversion unit of the phase difference detection pixel 52A. Further, the center of the opening (outline portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

With such a configuration, it is possible to detect a phase difference in the row direction X in an image captured by each of two pixel groups, that is, a pixel group that includes the phase difference detection pixels 52A which are positioned in an arbitrary row, and a pixel group that includes the phase difference detection pixels 52B which are disposed at the same distance in the same direction with respect to each of the phase difference detection pixels 52A of the former pixel group.

As shown in FIG. 4, in the AF area 53, at least one pair line in which a pixel pair P1 that includes the phase difference detection pixel 52A and the phase difference detection pixel 52B disposed at a predetermined distance in a direction orthogonal to the phase difference detection direction (row direction X) with respect to the phase difference detection pixel 52A and a pixel pair P2 having a reverse positional relationship with respect to the positional relationship of the phase difference detection pixel 52A and the phase difference detection pixel 52B in the pixel pair P1 are alternately disposed in the X direction is provided.

It can be said that the pair line includes a first pair of a first signal detection unit group (phase difference detection pixels 52A of the entire pixel pairs P1) including plural phase difference detection pixels 52A arranged along the phase difference detection direction and a signal detection unit group (phase difference detection pixels 52B of the entire pixel pairs P1) including the phase difference detection pixels 52B arranged at the same distance (distance corresponding to one pixel) in one direction along the Y direction (downward direction in the example shown in FIG. 4) with respect to the respective phase difference detection pixels 52A of the first signal detection unit group; and a second pair of a second signal detection unit group (phase difference detection pixels 52A of the entire pixel pairs P2) including plural phase difference detection pixels 52A arranged at the same distance in the same direction (on a diagonally lower right side in the example in FIG. 4) with respect to the respective phase difference detection pixels 52A of the first signal detection unit group and arranged along the detection direction and a signal detection unit group (phase difference detection pixels 52B of the entire pixel pairs P2) including the phase difference detection pixels 52B arranged at the same distance (distance corresponding to one pixel) in a direction (upward direction in the example shown in FIG. 4) different from the one direction of the Y direction with respect to the respective phase difference detection pixels 52A of the second signal detection unit group.

The phase difference AF processing unit 19 shown in FIG. 1 calculates a phase difference which is a relative position deviation amount of two images formed by the pair of beams using a detection signal group read from the phase difference detection pixels 52A and the phase difference detection pixels 52B disposed in one AF area 53 selected by a user operation or the like from among nine AF areas 53.

Further, the phase difference AF processing unit 19 calculates a focus adjustment state of the imaging lens 1 based on the phase difference. Here, the phase difference AF processing unit 19 calculates a deviation amount from a focused state and a deviation direction from the focused state, that is, a defocus amount. The phase difference AF processing unit 19 determines a focusing position of the focus lens from the defocus amount.

The system control unit 11 functions as a focus control unit that performs a first focus control for moving the focus lens to the focusing position determined by the phase difference AF processing unit 19 based on detection signals of the phase difference detection pixel 52A and the phase difference detection pixel 52B.

The contrast AF processing unit 18 shown in FIG. 1 analyzes an image captured by one AF area 53 selected by a user operation or the like from among nine AF areas 53, and determines a focusing position of the imaging lens 1 according to a known contrast AF method.

That is, the contrast AF processing unit 18 calculates, while moving the position of the focus lens of the imaging lens 1 under the control of the system control unit 11, contrast (brightness difference) of images obtained at respective movement positions (plural positions). Further, the contrast AF processing unit 18 determines the position of the focus lens where the contrast becomes maximum as the focusing position. The contrast is obtained by using a sum of differences of signals of adjacent signals.

The system control unit 11 functions as a focus control unit that performs a second focus control for moving the focus lens, in a maximum range (range from INF to MOD) where the focus lens is movable, along an optical axis direction from an end of the range by an arbitrary distance, and moving the focus lens to the focusing position determined by the contrast AF processing unit 18 based on the contrast of the captured images captured by the solid-state imaging element 5 at the respective movement positions.

Instead of one AF area 53, plural AF areas 53 which are continuously arranged may be selected.

In the digital camera of this embodiment, if there is an instruction for performing AF, the system control unit 11 performs the first focus control based on the phase difference AF method or the second focus control based on the contrast AF method.

The system control unit 11 functions as a focus control determination unit that determines which one of the first focus control and the second focus control is to be performed based on information (reliability level determination values J1 and J2 to be described later) generated using detection signals of the phase difference detection pixels 52A and the phase difference detection pixels 52B.

Further, when it is determined that the second focus control is to be performed, the system control unit 11 functions as a control unit that variably controls the arbitrary distance according to the information. The arbitrary distance is set as an initial value when power is supplied.

If the arbitrary distance is shorter than an initial value, the focus lens is minutely moved in the range from INF to MOD to calculate contrast values at a large number of positions. Thus, compared with a case where the arbitrary distance is equal to the initial value, determination accuracy of the focusing position is enhanced, but the speed until the focusing position is determined decreases.

If the arbitrary distance is longer than the initial value, the focus lens is greatly moved in the range from INF to MOD to calculate contrast values at a small number of positions. Thus, compared with a case where the arbitrary distance is equal to the initial value, determination accuracy of the focusing position is lowered, but the speed until the focusing position is determined increases.

Hereinafter, an operation of the digital camera after an AF instruction is performed when capturing of a static image will be described.

Figure 5:
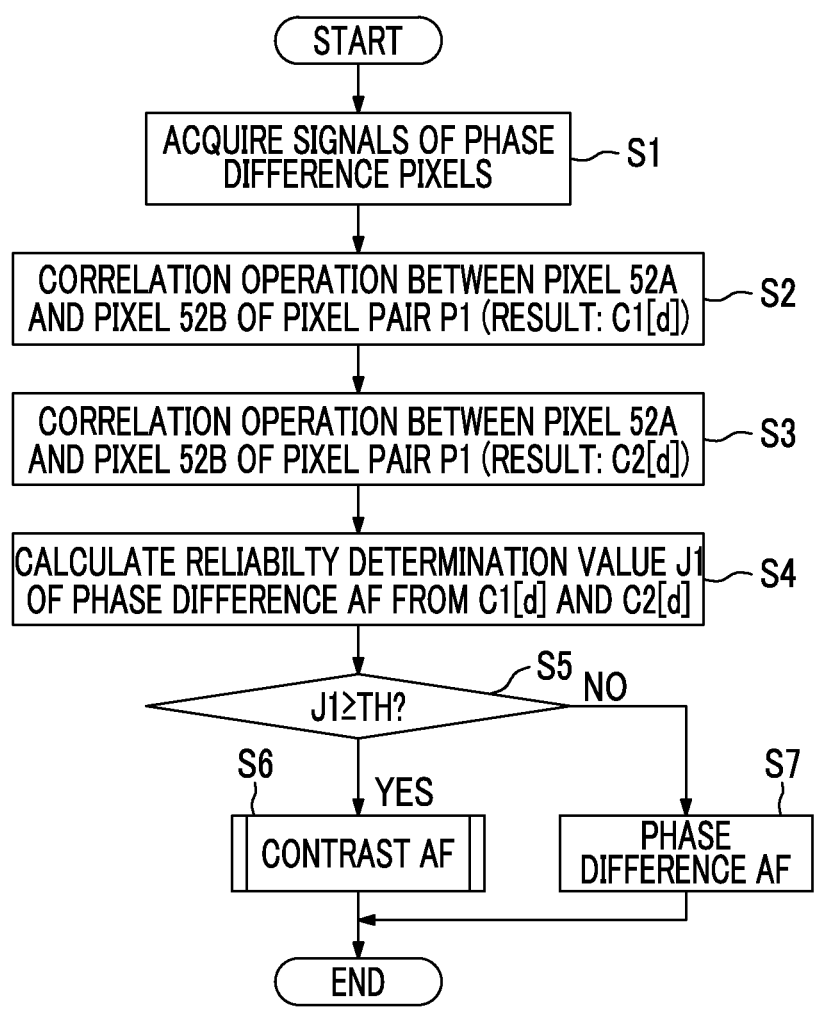
FIG. 5 is a flowchart illustrating an AF operation of the digital camera shown in FIG. 1.

FIG. 5 is a flowchart illustrating an AF operation of the digital camera shown in FIG. 1.

If there is an AF instruction, first, the phase difference AF processing unit 19 acquires detection signals of the phase difference detection pixels 52A and the phase difference detection pixels 52B disposed in a selected AF area 53 (step S1).

Then, the phase difference AF processing unit 19 performs a correlation operation between detection signal groups of the phase difference detection pixels 52A and the phase difference detection pixels 52B of the pixel pairs P1 that form one pair line, among the acquired detection signals (step S2).

Specifically, when data on one detection signal group is represented as A[1], . . . , and A[k] and data on the other detection signal group is represented as B[1], . . . , and B[k], an area C[d] surrounded by two data waveforms calculated by the following expression when two sets of data are deviated by a shift amount "d" is calculated.

$$C[d] = \sum_{n=1}^{k} (A[n+d] - B[n])^2 \quad (1)$$

$$d = -L, \ldots, -2, -1, 0, 1, 2, \ldots, L$$

Hereinafter, the result of the correlation operation in step S2 is represented as C1[d]. The correlation operation result C1[d] is a value indicating a matching rate of images captured by each phase difference detection pixel 52A and each phase difference detection pixel 52B of the pixel pair P1.

Subsequently, the phase difference AF processing unit 19 performs a correlation operation between detection signal groups of the phase difference detection pixels 52A and the phase difference detection pixels 52B of the pixel pairs P2 that form one pair line, among the acquired detection signals (step S3).

The correlation operation result is represented as C2[d]. The correlation operation result C2[d] is a value indicating a matching rate of images captured by each phase difference detection pixel 52A and each phase difference detection pixel 52B of the pixel pair P2.

Next, the phase difference AF processing unit 19 generates a reliability determination value J1 for determining reliability of each of the correlation operation result C1[d] and the correlation operation result C2[d], using the correlation operation result C1[d] and the correlation operation result C2[d] (step S4). The phase difference AF processing unit 19 functions as an information generation unit.

When the frequency of a subject image formed in the pair line is low, a shape of a graph in which a transverse axis represents the shift amount d and a longitudinal axis represents C[d] is approximately the same between C1[d] and C2[d]. However, when the frequency of the subject image formed in the pair line is high, the shape of the graph greatly varies between C1[d] and C2[d].

In this way, from the fact that the correlation operation results are different between two pixel pairs P1 and P2 even in the area where the same subject image is formed, it can be determined that there is a high possibility that the correlation operation results are erroneous, and that the reliability of the focusing position determined using the detection signals of the phase difference detection pixels in the pair line is low.

Then, the phase difference AF processing unit 19 that functions as a reliability determination value generation unit compares the shape of the graph based on C1[d] with the shape of the graph based on C2[d] to generate the reliability determination value J1.

Specifically, the phase difference AF processing unit 19 generates the reliability determination value J1 by performing an operation of the following Expression (2).

$$J1 = \frac{\sum_{d=-L}^{L} |C1[d] - C2[d]|}{\sum_{d=-L}^{L} C1[d] + \sum_{d=-L}^{L} C2[d]} \quad (2)$$

A numerator of Expression (2) becomes a small value when the shape of the graph based on C1[d] and the shape of the graph based on C2[d] are similar to each other, and becomes a large value when the two shapes are different from each other.

Accordingly, the reliability determination value J1 is generated in step S4, and then, the system control unit 11 compares the reliability determination value J1 with a predetermined threshold value TH. When J1 is equal to or greater than the threshold value TH (step S5: YES), the system control unit 11 determines that the reliability of the focus control based on the phase difference AF method is low, selects the contrast AF processing unit 18, and determines the focusing position using the contrast AF processing unit 18. Further, the system control unit 11 performs the focus control of the imaging lens 1 according to the determined focusing position (step S6).

Further, when the reliability determination value J1 is smaller than the threshold value TH (step S5: NO), the system control unit 11 determines that the reliability of the focus control based on the phase difference AF method is high, selects the phase difference AF processing unit 19, and determines the focusing position using the phase difference AF processing unit 19. Further, the system control unit 11 performs the focus control of the imaging lens 1 according to the determined focusing position (step S7).

When there are plural pair lines in the selected AF area 53, the phase difference AF processing unit 19 generates the reliability determination value J1 by performing the processes of steps S2 to S4 for each pair line.

Further, when there is at least one pair line where the reliability determination value J1 is smaller than the threshold value TH among the plural pair lines, the system control unit 11 determines that the reliability of the focus control based on the phase difference AF method is high with respect to the selected AF area 53. In addition, in step S7, the system control unit 11 determines the focusing position using detection signals read from the pair line where the reliability determination value J1 is smaller than the threshold value TH.

That is, the system control unit 11 performs the focus control based on the phase difference AF method using detection signals of the phase difference detection pixels disposed in pair lines other than the pair line for which it is determined that the reliability is lower than the threshold value.

Here, when there are plural pair lines where the reliability determination value J1 is smaller than the threshold value TH, the phase difference AF processing unit 19 determines the focusing position based on an average of defocus amounts calculated for each pair line, for example.

Further, when there is no pair line where the reliability determination value J1 is smaller than the threshold value TH among the plural pair lines, the system control unit 11 determines that the reliability of the focus control based on the phase difference AF method is low with respect to the selected AF area 53.

Figure 6:
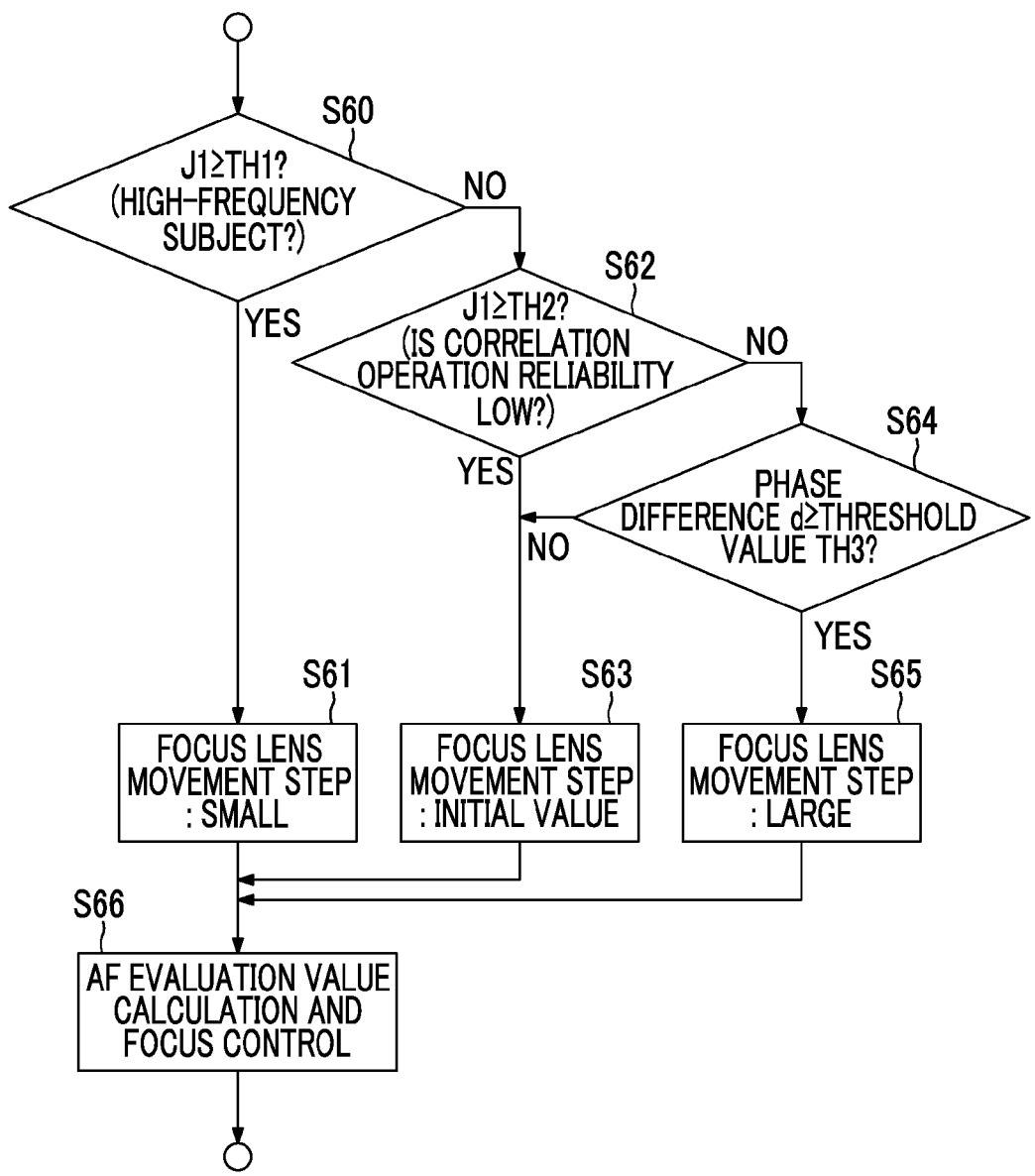
FIG. 6 is a flowchart illustrating a process of step S6 in the flowchart of FIG. 5.

FIG. 6 is a flowchart illustrating details of the process of step S6 in the flowchart of FIG. 5.

First, in step S60, the system control unit 11 compares the reliability determination value J1 with a threshold value TH1. The threshold value TH1 is a value larger than the threshold value TH.

As described above, when the frequency of the subject image formed in the AF area 53 is high, the reliability determination value J1 becomes a large value. On the other hand, even when the frequency of the subject image formed in the AF area 53 is not high, if ghost or flare is locally generated, for example, the reliability determination value J1 is still a large value, but becomes a small value compared with a case where the frequency of the subject is high. Thus, it is possible to determine a factor for the selection of the focus control based on the contrast AF method, according to the size of the reliability determination value J1.

Specifically, when J1≥TH1 (step S60: YES), since the frequency of the subject image formed in the AF area 53 is high, the system control unit 11 determines that the accuracy of the phase difference AF cannot be obtained in this situation, and performs a process of step S61.

In step S61, the system control unit 11 sets an arbitrary distance when moving the focus lens to be smaller than an initial value in order to obtain a contrast value (AF evaluation value) of contrast AF.

Here, the reason that the arbitrary distance is set to be smaller than the initial value is because enhancement of the AF accuracy is achieved when the frequency of the subject image formed in the AF area 53 is high and the contrast value is acquired at more minute intervals.

If J1<TH1 (step S60: NO), the system control unit 11 determines that the frequency of the subject image formed in the AF area 53 is not high but the accuracy of the phase difference AF is not obtained due to other factors, and compares the reliability determination value J1 with a threshold value TH2 in step S62. The threshold value TH2 is a value smaller than the threshold value TH1 and larger than the threshold value TH.

When the reliability determination value J1 is equal to or greater than the threshold value TH2, it can be said that the reliability of the correlation operation results in steps S2 and S3 is low. On the other hand, if the reliability determination value J1 is smaller than the threshold value TH2, it can be said that the reliability of the correlation operation results in step S2 and S3 is high.

Thus, when J1≤TH2 (step S62: YES), the system control unit 11 performs a process of step S63, and when J1<TH2 (step S62: NO), the system control unit 11 performs a process of step S64.

In step S63, the system control unit 11 sets the arbitrary distance to the initial value. The reason that the arbitrary distance is set to the initial value is because it is possible to expect a certain degree of focusing accuracy even though the frequency of the subject image formed in the AF area 53 is low and the arbitrary distance is not short.

In step S64, the system control unit 11 compares a value d (phase difference of two images captured by the pixel pair P1) when C1[d] obtained in step S2 of FIG. 5 is minimum or a value d (phase difference of two images captured by the pixel pair P2) when C2[d] obtained in step S3 of FIG. 5 is minimum with a threshold value TH3. The threshold value TH3 is a value determined irrespective of the threshold values TH, TH1, and TH2.

If the phase difference d is equal to or greater than the threshold value TH3 (step S64: YES), the system control unit 11 sets the arbitrary distance to be larger than the initial value, in step S65.

When the determination in step S62 is NO, the reliability of the correlation operation results in steps S2 and S3 is not so high that the phase difference AF can be performed but is not excessively low. In this case, the phase difference obtained from the correlation operation results in steps S2 and S3 is a value which is reliable to a certain degree.

Thus, when d≥TH3, it can be expected that the defocus amount is high and a long distance is necessary for moving the focus lens from a current position to the focusing position. Accordingly, in this case, by setting the arbitrary distance to be larger than the initial value, it is possible to reduce time until the position of the focus lens where the contrast becomes a peak can be detected, to thereby increase a focusing speed.

If the phase difference d is smaller than the threshold value TH3 (step S64: NO), the system control unit 11 sets the arbitrary distance to the initial value in step S63.

When d<TH3, even though the arbitrary distance is set not to be larger than the initial value, since the time until the position of the focus lens where the contrast becomes the peak is detected is reduced, it is possible to determine the focusing position with high accuracy without delaying the focusing speed due to setting the arbitrary distance to the initial value.

After steps S61, 63, and S65, a process of step S66 is performed. In step S66, the system control unit 11 performs initial driving for moving the focus lens from the current position to INF or MOD, and then, sequentially moves the focus lens in the range from INF to MOD according to the set arbitrary distance.

Further, the contrast AF processing unit 18 acquires the AF evaluation value at each movement position of the focus lens, and determines the focusing position based on the AF evaluation value. Finally, the system control unit 11 moves the focus lens to the determined focusing position.

In FIG. 6, instead of steps S62, S64, and S65, when the determination in step S60 is NO, the process of step S63 may be performed.

As described above, in a state where the reliability determination value J1 is equal to or greater than the threshold value TH and the focusing accuracy cannot be sufficiently secured by the focus control based on the phase difference AF method, the digital camera shown in FIG. 1 transitions to the focus control based on the contrast AF method. Here, since the arbitrary distance is variably controlled according to the size of the reliability determination value J1, it is possible to perform the contrast AF in which the focusing speed and the focusing accuracy are compatible.

Further, since the arbitrary distance is variably controlled in consideration of the size of the phase difference d in addition to the reliability determination value J1, it is possible to further increase the focusing speed.

In step S66 of FIG. 6, an operation example in which the system control unit 11 performs the initial driving is shown, but when the reliability of the correlation operation results in steps S2 and S3 is high, the direction of the focusing position with respect to the current position of the focus lens (this direction is obtained from the correlation operation results) is reliable to a certain extent.

Thus, in FIG. 6, when the processes are performed in the order of step S64, step S63, and step S66 or in the order of step S64, step S65, and step S66, the initial driving may not be performed in step S66. Hereinafter, an operation example in which the initial driving is not performed will be described.

Figure 7:
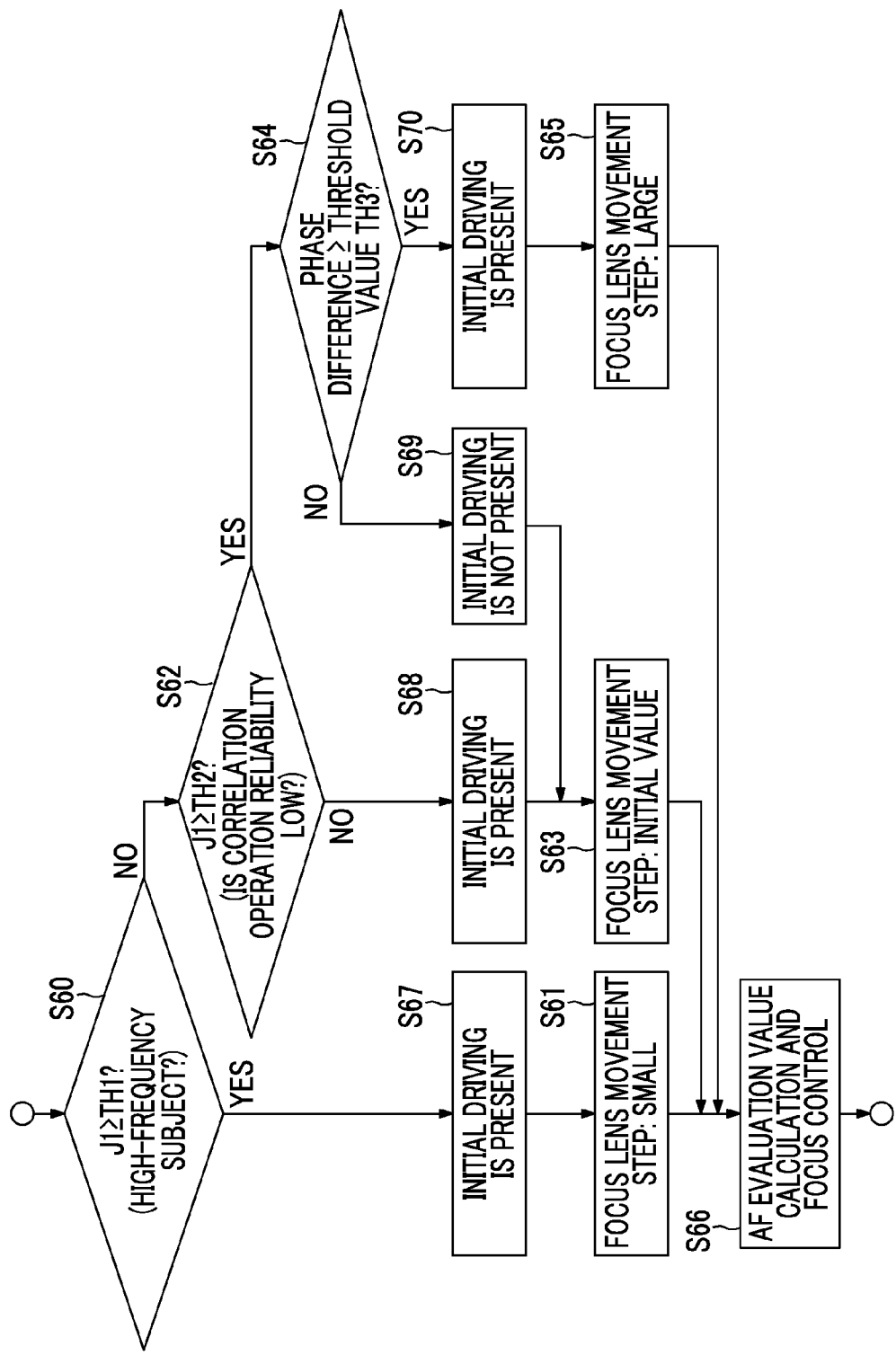
FIG. 7 is a flowchart illustrating a modification example of the process of step S6 in the flowchart of FIG. 5.

FIG. 7 is a flowchart illustrating a modification example of the process of step S6 in the flowchart shown in FIG. 5. In FIG. 7, the same reference numerals are given to the same processes as in FIG. 6, and description thereof will not be repeated.

When the determination in step S60 is YES, the system control unit 11 performs a setting that the initial driving is present (step S67), and proceeds to step S61.

When the determination in step S62 is NO, the system control unit 11 performs a setting that the initial driving is present (step S68), and proceeds to step S63.

When the determination in step S64 is NO, the system control unit 11 performs a setting that the initial driving is not present (step S69), and proceeds to step S63.

When the determination in step S64 is YES, the system control unit 11 performs a setting that the initial driving is present (step S70), and proceeds to step S65.

In step S66, when the setting that the initial driving is present is performed, the system control unit 11 performs the initial driving, and then, moves the focus lens by an arbitrary distance. Further, when the setting that the initial driving is not present is performed, the system control unit 11 does not perform the initial driving, and moves the focus lens in the direction of the phase difference obtained from the correlation operation result in step S2 or S3 by an arbitrary distance, using a current position of the focus lens as a starting point.

In this way, by determining the presence or absence of the initial driving according to the size of the reliability determination value J1, it is possible to further increase the focusing speed of the contrast AF.

It can be understood by a simulation, an experiment, or the like that the increase in the reliability determination value J1 due to a high-frequency subject occurs only when the current position of the focus lens is not so distant from the focusing position.

Thus, in step S67 of FIG. 7, a setting of narrowing the lens movement range compared with the maximum range may be performed, instead of performing the setting that the initial driving is present.

For example, a range defined by a predetermined distance in the optical axis direction on front and rear sides with reference to the current position of the focus lens (a range narrower than the maximum range where the focus lens is movable) may be set as the lens movement range. Thus, compared with a case where the initial driving is performed, it is possible to narrow the lens movement range, to thereby increase the focusing speed.

As a method of determining the focusing position in step S7 of FIG. 5, a method of determining the defocus amount based on the correlation operation result C1[$d$] and determining the focusing position according to the defocus amount, a method of determining the defocus amount based on the correlation operation result C2[$d$] and determining the focusing position according to the defocus amount, a method of determining the focusing position according to, for example, an average value of two defocus amounts, or the like may be employed.

Figure 8:
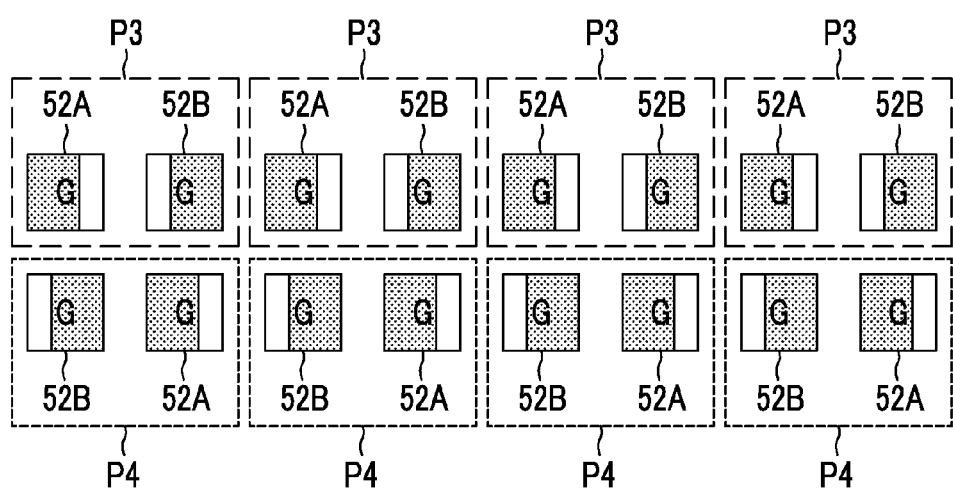
FIG. 8 is a diagram illustrating a modification example of a pixel pair set in a pair line.

Hereinbefore, an example in which the pair line disposed in the AF area 53 is a line including the pixel pairs P1 and the pixel pairs P2 is shown, but as shown in FIG. 8, it can also be said that the pair line is a line including pixel pairs P3 and pixel pairs P4.

That is, the pair line may be configured to include a line in which the pixel pairs P3 including the phase difference detection pixel 52A and the phase difference detection pixel 52B disposed at a predetermined distance with respect to the phase difference detection pixel 52A in the phase difference detection direction (row direction X) are arranged in the row direction X and a line in which the pixel pairs P4 having a reverse positional relationship with respect to the positional relationship of the phase difference detection pixel 52A and the phase difference detection pixel 52B in the pixel pair P3 are arranged disposed in the X direction.

When the pixel pairs P3 and P4 are set in the pair line as shown in FIG. 8, the phase difference AF processing unit 19 performs a correlation operation between detection signal groups of the phase difference detection pixels 52A and 52B of the pixel pair P3, in step S2 of FIG. 5, and performs a correlation operation between detection signal groups of the phase difference detection pixels 52A and 52B of the pixel pair P4, in step S3 of FIG. 5. Further, in step S4, the reliability determination value J1 is generated based on two correlation operation results.

Thus, it is possible to perform reliability determination of the focus control based on the phase difference AF method using only the detection signals of the phase difference detection pixels.

Hereinbefore, an example in which a reliability determination value is generated using a correlation operation result of two images captured by each of two pixel pairs that form a pair line is described, but information corresponding to the reliability determination value may be generated without performing the correlation operation.

Specifically, the phase difference AF processing unit 19 generates a ratio between an integrated value of detection signals of the phase difference detection pixels 52A and an integrated value of detection signals of the phase difference detection pixels 52B, which are output from the entire pixel pairs P1 that form the pair line, as a matching rate of two images captured by the entire pixel pairs P1.

Similarly, the phase difference AF processing unit 19 generates a ratio between an integrated value of detection signals of the phase difference detection pixels 52A and an integrated value of detection signals of the phase difference detection pixels 52B, which are output from the entire pixel pairs P2 that form the pair line, as a matching rate of two images captured by the entire pixel pairs P2.

When the frequency of the subject image formed in the pair line is low, the integrated value of the detection signals of the phase difference detection pixels 52A of the entire pixel pairs P1 and the integrated value of the detection signals of the phase difference detection pixels 52B of the entire pixel pairs P1 become approximately the same value when a difference due to phase differences between the images captured by the phase difference detection pixels 52A and the images captured by the phase difference detection pixels 52B is excluded.

Further, the integrated value of the detection signals of the phase difference detection pixels 52A of the entire pixel pairs P2 and the integrated value of the detection signals of the phase difference detection pixels 52B of the entire pixel pairs P2 become approximately the same value when a difference due to phase differences is excluded.

Figure 9:
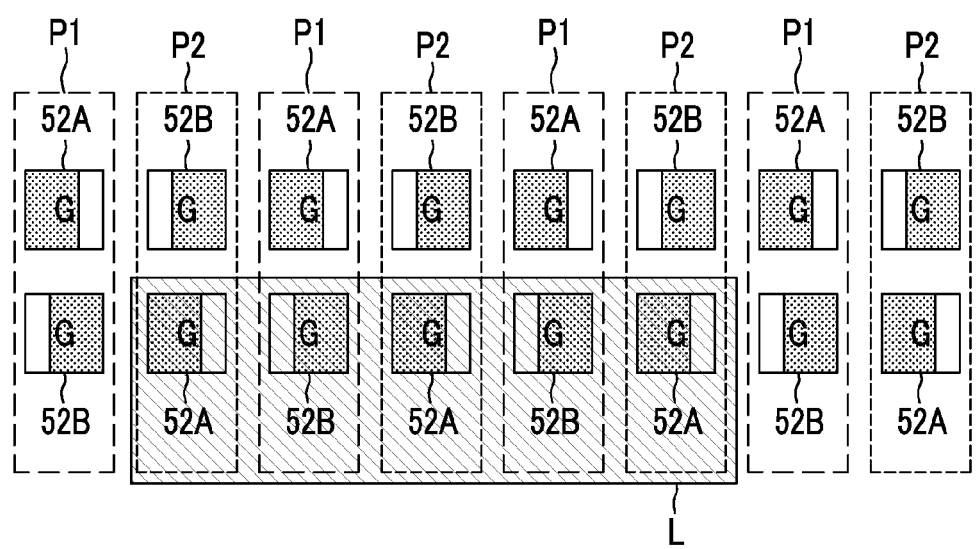
FIG. 9 is a diagram illustrating an example of a straight line L that extends in a phase difference detection direction.

On the other hand, as shown in FIG. 9, when a subject portion including a straight line L is formed in the pair line, the integrated value of the detection signals of the phase difference detection pixels 52A of the entire pixel pairs P1 and the integrated value of the detection signals of the phase difference detection pixels 52B of the entire pixel pairs P1 become greatly different values even when the difference due to the phase differences is excluded.

Further, the integrated value of the detection signals of the phase difference detection pixels 52A of the entire pixel pairs P2 and the integrated value of the detection signals of the phase difference detection pixels 52B of the entire pixel pairs P2 become greatly different values even when the difference due to the phase differences is excluded.

In this way, with only comparison between the integrated value in the phase difference detection pixels 52A and the integrated value in the phase difference detection pixels 52B in the same pixel pairs, it is difficult to determine whether the difference of the integrated values is generated by the phase differences or by a subject of a high frequency.

In any pixel pair P1 and any pixel pair P2, the same phase difference occurs in captured images. Using this fact, by subtracting the ratio between the integrated value of the detection signals of the phase difference detection pixels 52A and the integrated value of the detection signals of the phase difference detection pixels 52B, in the pixel pair P2, from the ratio between the integrated value of the detection signals of the phase difference detection pixels 52A and the integrated value of the detection signals of the phase difference detection pixels 52B, in the pixel pair P1, it is possible to cancel out the difference of the integrated values due to the phase difference. If the difference of the integrated values due to the phase difference can be canceled out, it is possible to determine the presence or absence of the straight line L as shown in FIG. 9.

Thus, the phase difference AF processing unit 19 generates a reliability determination value J2 for determining reliability of a focus control based on the phase difference AF method using the phase difference detection pixels 52A and the phase difference detection pixels 52B included in the pair line, using the following operation expression (3). A phase difference AF processing unit functions as an information generation unit.

$$J2 = \left| \frac{\Sigma P1A}{\Sigma P1B} - \frac{\Sigma P2A}{\Sigma P2B} \right| \tag{3}$$

In Expression (3), $\Sigma P1A$ represents an integrated value of detection signals of the phase difference detection pixels 52A that belong to the entire pixel pairs P1 disposed in a pair line.

$\Sigma P1B$ represents an integrated value of detection signals of the phase difference detection pixels 52B that belong to the entire pixel pairs P1 disposed in a pair line.

$\Sigma P2A$ represents an integrated value of detection signals of the phase difference detection pixels 52A that belong to the entire pixel pairs P2 disposed in a pair line.

$\Sigma P2B$ represents an integrated value of detection signals of the phase difference detection pixels 52B that belong to the entire pixel pairs P2 disposed in a pair line.

When the value of J2 is large, it is possible to determine that the straight line L is present as shown in FIG. 9. When the straight line L is present, it is difficult to calculate a defocus amount with high accuracy using a correlation operation between the detection signals of the phase difference detection pixels 52A and the detection signals of the phase difference detection pixels 52B.

Thus, the system control unit 11 compares the value of J2 with a predetermined threshold value th. When J2≥th, it is determined that the reliability of the phase difference AF is low and the focusing accuracy is not sufficiently obtained in the focus control based on the phase difference AF. Further, when J2<th, it is determined that the focusing accuracy is sufficiently obtained in the focus control based on the phase difference AF. The threshold value th is set according to an allowable value of the focusing accuracy based on the phase difference AF.

Figure 10:
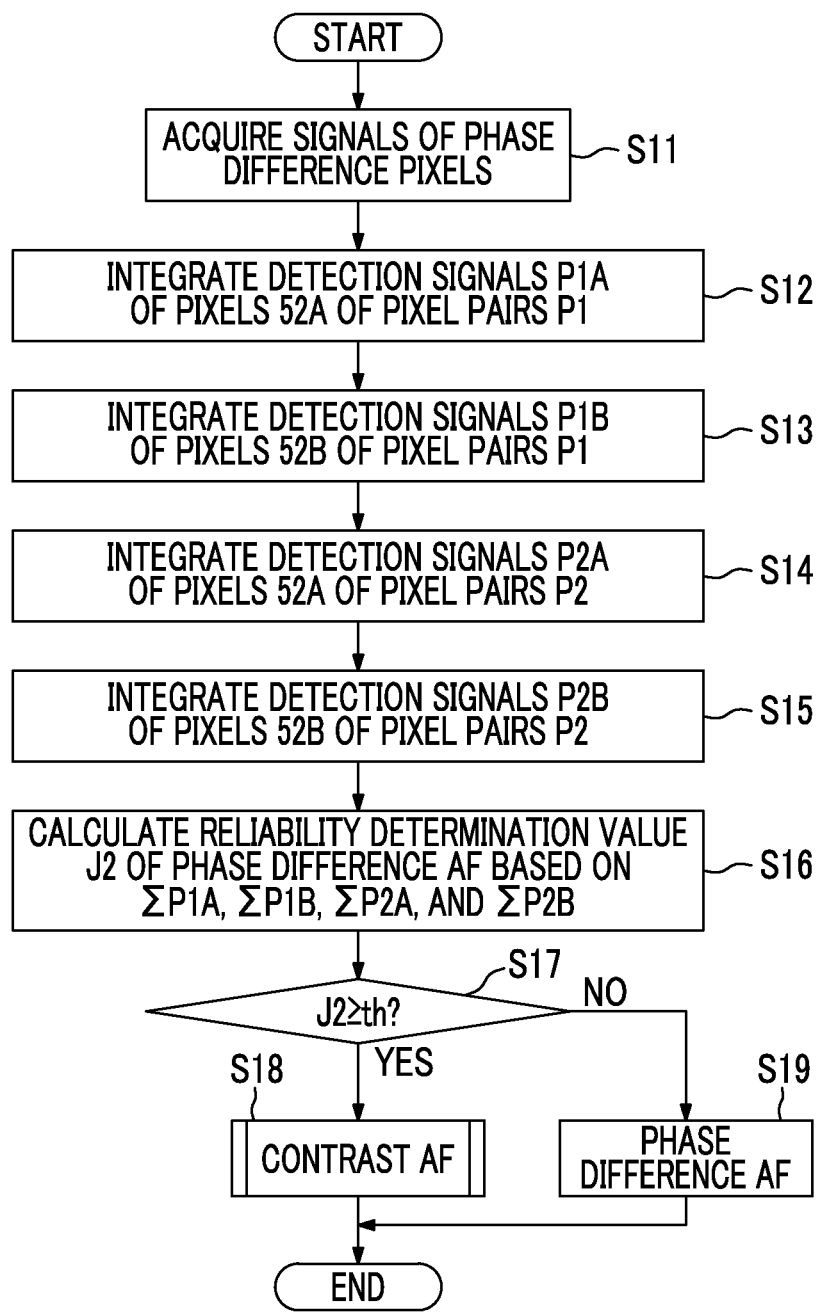
FIG. 10 is a flowchart illustrating a modification example of the AF operation of the digital camera shown in FIG. 1.

FIG. 10 is a flowchart illustrating a modification example of the AF operation of the digital camera shown in FIG. 1.

If there is an AF instruction, first, the phase difference AF processing unit 19 acquires detection signals of the phase difference detection pixels 52A and the phase difference detection pixels 52B disposed in a selected AF area (step S11).

Then, the phase difference AF processing unit 19 integrates output signals of the phase difference detection pixels 52A of the pixel pairs P1 that form one pair line among the acquired detection signals to obtain an integrated value $\Sigma P1A$ (step S12).

Then, the phase difference AF processing unit 19 integrates output signals of the phase difference detection pixels 52B of the pixel pairs P1 that form one pair line among the acquired detection signals to obtain an integrated value ΣP1B (step S13).

Then, the phase difference AF processing unit 19 integrates output signals of the phase difference detection pixels 52A of the pixel pairs P2 that form one pair line among the acquired detection signals to obtain an integrated value ΣP2A (step S14).

Then, the phase difference AF processing unit 19 integrates output signals of the phase difference detection pixels 52B of the pixel pairs P2 that form one pair line among the acquired detection signals to obtain an integrated value ΣP2B (step S15).

Then, the phase difference AF processing unit 19 that functions as a reliability determination generation unit generates the reliability determination value J2 by an operation of Expression (3) based on ΣP1A, ΣP1B, ΣP2A, and ΣP2B (step S16).

After the reliability determination value J2 is generated in step S16, the system control unit 11 compares the reliability determination value J2 with the threshold value th. When J2≥th (step S17: YES), the system control unit 11 determines that the reliability of the focus control based on the phase difference AF method is low. Then, the system control unit 11 determines the focusing position using the contrast AF processing unit 18, and performs the focus control of the imaging lens 1 according to the determined focusing position (step S18).

When J2<th (step S17: NO), the system control unit 11 determines that the reliability of the focus control based on the phase difference AF method is high. Then, the system control unit 11 determines the focusing position using the phase difference AF processing unit 19, and performs the focus control of the imaging lens 1 according to the determined focusing position (step S19).

When there are plural pair lines in the selected AF area 53, the phase difference AF processing unit 19 generates the reliability determination value J2 by performing the processes of steps S12 to S16 for each pair line.

When there is a pair line where the reliability determination value J2 is smaller than the threshold value th among the plural pair lines, the system control unit 11 determines that the reliability of the focus control based on the phase difference AF method is high with respect to the selected AF area 53. In addition, in step S19, the system control unit 11 determines the focusing position using detection signals read from the pair line where the reliability determination value J2 is smaller than the threshold value th.

Here, when there are plural pair lines where the reliability determination value J2 is smaller than the threshold value th, the phase difference value AF processing unit 19 determines the focusing position based on an average of the defocus amounts calculated for each pair line, for example.

Further, when there is no pair line where the reliability determination value J2 is smaller than the threshold value th among the plural pair lines, the system control unit 11 determines that the reliability of the focus control based on the phase difference AF method is low with respect to the selected AF area 53, and performs the process of step S18.

Figure 11:
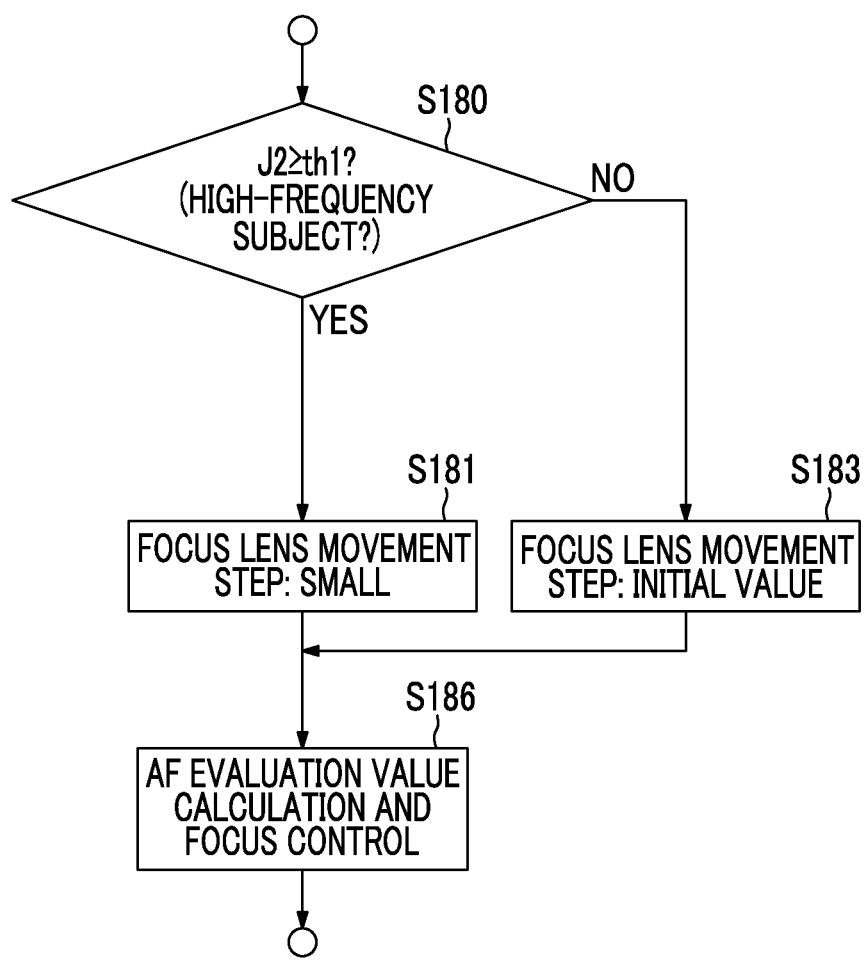
FIG. 11 is a flowchart illustrating a process of step S18 in the flowchart of FIG. 10.

FIG. 11 is a flowchart illustrating details of the process of step S18 in the flowchart shown in FIG. 10.

First, in step S180, the system control unit 11 compares the reliability determination value J2 with a predetermined threshold value th1. The threshold value th1 is a value greater than the threshold value th.

When the frequency of the subject image formed in the AF area 53 is high, the reliability determination value J2 becomes a large value. On the other hand, even when the frequency of the subject image formed in the AF area 53 is not high, if ghost or flare is locally generated, for example, the reliability determination value J2 is still a large value, but becomes a small value compared with a case where the frequency of the subject is high. Thus, it is possible to determine a factor for the selection of the focus control based on the contrast AF method, according to the size of the reliability determination value J2.

Specifically, in step S180, the system control unit 11 compares J2 with the threshold value th1. When J2≥th1, since the frequency of the subject image formed in the AF area 53 is high, the system control unit 11 determines that the accuracy of the phase difference AF cannot be obtained in this situation, and performs a process of step S181. Step S181 is the same process as step S61 in FIG. 6.

When J2<th1 (step S180: NO), the system control unit 11 performs a process of step S183. Step S183 is the same process as step S63 in FIG. 6.

After steps S181 and S183, a process of step S186 is performed. Step S186 is the same process as step S66 in FIG. 6.

It can be understood by a simulation, an experiment, or the like that the increase in the reliability determination value J2 due to a high-frequency subject occurs only when the current position of the focus lens is not so distant from the focusing position.

Thus, between step S180 and step S181 in FIG. 11, a setting of narrowing the lens movement range in the process of step S186 compared with the range in the initial driving may be performed.

For example, a range defined by a predetermined distance in the optical axis direction on front and rear sides with reference to the current position of the focus lens may be set as the lens movement range. Thus, compared with a case where the initial driving is performed, it is possible to narrow the lens movement range, to thereby increase the focusing speed.

As described above, according to the operation example shown in FIG. 10, it is possible to generate the reliability determination value J2 corresponding to the reliability determination value J1 without performing the correlation operation, and thus, it is possible to increase the focusing speed when transitioning to the contrast AF. Further, it is possible to reduce computation when transitioning to the contrast AF, to thereby reduce power consumption.

Even in a case where the reliability determination value is calculated based on the ratio between the integrated value of the detection signals of the phase difference detection pixels 52A and the integrated value of the detection signals of the phase difference detection pixels 52B, it is possible to generate the reliability determination value using the pixel pairs set in the pair line as P3 and P4 instead of P1 and P2.

Generally, when the focusing position is determined according to the contrast AF method, a horizontal focusing algorithm (a first algorithm) for focusing on a subject of which a horizontal component is a main component, and a vertical focusing algorithm (a second algorithm) for focusing a subject of which a vertical component is a main component are sequentially executed. Thus, an operation load becomes high, and there is a possibility that focusing is performed in a direction where the accuracy is not high, according to an execution order of the algorithms.

In the operation example of FIG. 10, the reliability determination value J2 is calculated, in which the reliability determination value J2 is effective information for determination of the presence or absence of the subject having the horizontal component as shown in FIG. 9. Thus, the system control unit 11 may determine an execution priority of the horizontal focusing algorithm and the vertical focusing algorithm using the reliability determination value J2, to thereby perform AF with high accuracy. Hereinafter, the operation will be described with reference to the flowchart.

Figure 12:
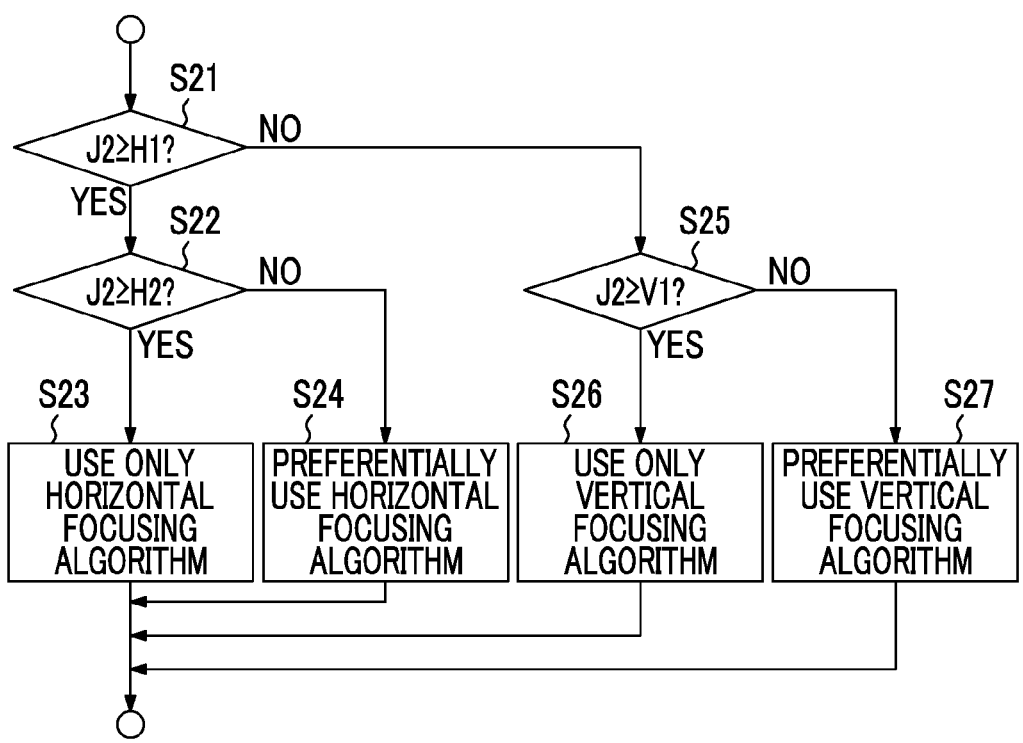
FIG. 12 is a flowchart illustrating a process between step S181 and step S186 in the flowchart of FIG. 11.

FIG. 12 is a flowchart illustrating processes added between step S181 and step S183, and step S186 in the flowchart of FIG. 11.

In step S21, the system control unit 11 compares the reliability determination value J2 with a threshold value H1 (>th). When J2≥H1, the system control unit 11 performs a process of step S22, and when J2<H1, the system control unit 11 performs a process of step S25.

In step S22, the system control unit 11 compares the reliability determination value J2 with a threshold value H2 (>H1). When J2≥H2, the system control unit 11 performs a process of step S23, and when J2<H2, the system control unit 11 performs a process of step S24.

In step S23, the system control unit 11 performs a setting for using only the horizontal focusing algorithm as an algorithm executed for determination of the focusing position in step S186 of FIG. 11.

In step S24, the system control unit 11 performs a setting for preferentially using the horizontal focusing algorithm as the algorithm executed for determination of the focusing position in step S186 of FIG. 11. That is, the system control unit 11 performs the setting so that the vertical focusing algorithm is executed after the horizontal focusing algorithm is executed.

In step S25, the system control unit 11 compares the reliability determination value J2 with a threshold value V1 (>th). When J2≥V1, the system control unit 11 performs a process of step S26, and when J2<V1, the system control unit 11 performs a process of step S27.

In step S26, the system control unit 11 performs a setting for using only the vertical focusing algorithm as the algorithm executed for determination of the focusing position in step S186 of FIG. 11.

In step S27, the system control unit 11 performs a setting for preferentially using the vertical focusing algorithm as the algorithm executed for determination of the focusing position in step S186 of FIG. 11. That is, the system control unit 11 performs the setting so that the horizontal focusing algorithm is executed after the vertical focusing algorithm is executed.

As described above, by setting the priority of the focusing algorithm based on the contrast AF method according to the size of the reliability determination value J2, it is possible to perform the contrast AF with high accuracy.

Hereinbefore, the AF operation when capturing the static image is described, but the invention may be applied to a so-called continuous AF mode in which focusing is continued with respect to a main subject, such as a video mode.

Figure 13:
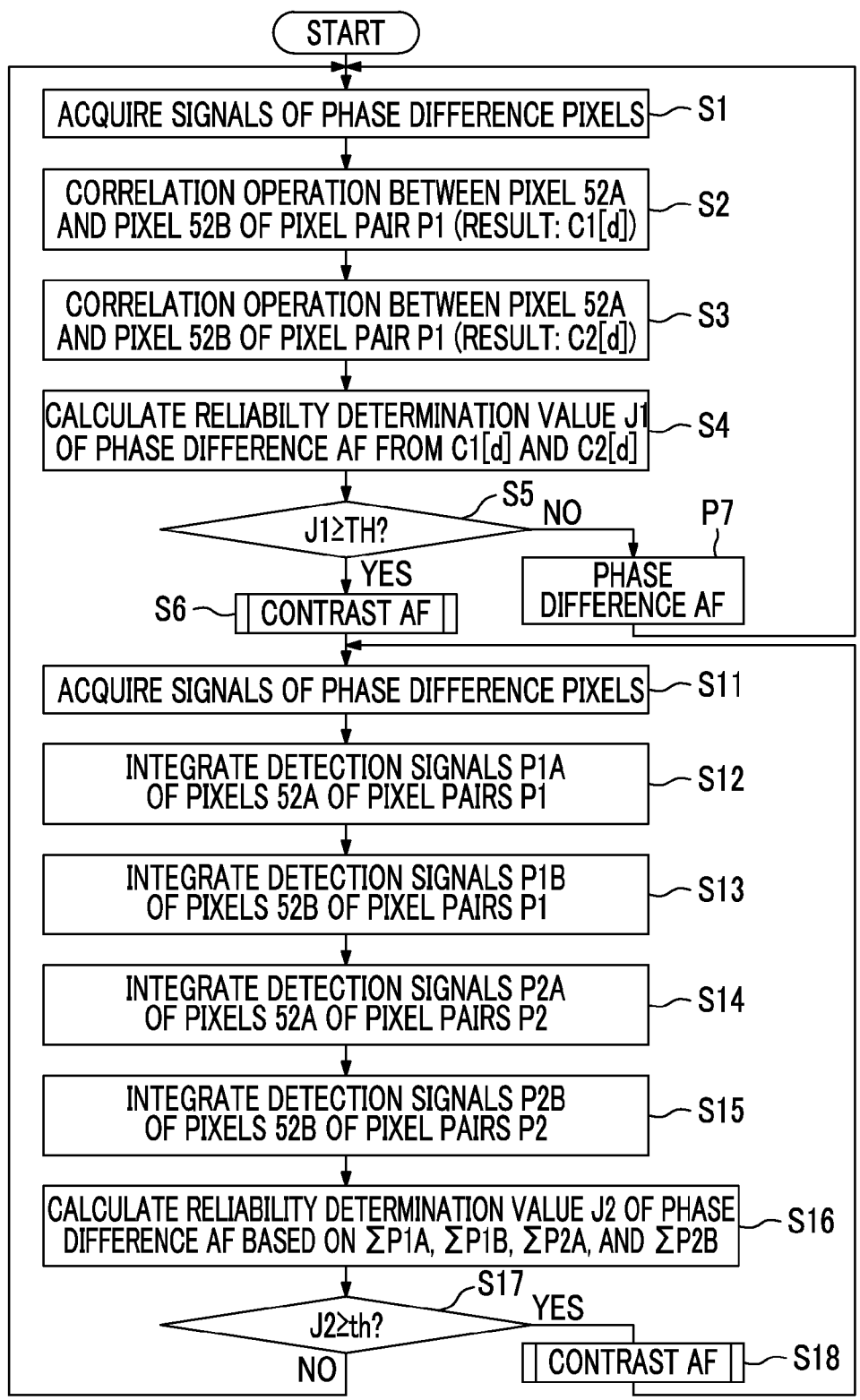
FIG. 13 is a flowchart illustrating a continuous AF operation of the digital camera shown in FIG. 1.

FIG. 13 is a flowchart illustrating an AF operation of the digital camera in a continuous AF mode. In FIG. 13, the same reference numerals are given to the same processes as the processes shown in FIGS. 5 and 10.

In the continuous AF mode, after the focus control based on the contrast AF method is performed in step S6, the phase difference AF processing unit 19 performs the processes of steps S11 to S16 to generate the reliability determination value J2.

Further, the system control unit 11 compares the reliability determination value J2 with the threshold value th in step S17. If J≥th, the system control unit 11 proceeds to step S18, and performs the contrast AF without determining which one of the contrast AF and the phase difference AF is to be performed.

On the other hand, in step S17, if J2<th, the procedure returns to the process of step S1. Further, in step S5, if J1<TH, the process of step S7 is performed, and then, the procedure returns to the process of step S1.

In FIG. 13, it is normally considered that the procedure returns to step S1 after step S6. However, since the reliability of the correlation operation is high immediately after focusing on the main subject, the procedure proceeds to the focus control based on the phase difference AF method, but when the main subject is continuously a high-frequency subject, the procedure proceeds to the focus control based on the contrast AF again. Thus, switching of the phase difference AF and the contrast AF frequently occurs.

According to the operation example of FIG. 13, the procedure does not proceed step S1 immediately after focusing on the main subject in the process of step S6, the reliability determination value J2 is generated. When the reliability determination value J2 is large as it is (that is, the main subject is the high-frequency subject as it is), the focus control based on the contrast AF is performed in step S18.

Thus, it is possible to stably perform the focus control without the frequent occurrence of the switching of the phase difference AF and the contrast AF. Further, when the contrast AF is continuously performed, since the processes of steps S1 to S4 are not performed, it is possible to reduce the computation, to thereby reduce power consumption.

Hereinbefore, an example in which two adjacent pixel lines that respectively include the phase detection pixels 52A and 52B disposed in the AF area 53 are used as one block and the reliability determination values J1 and J2 are generated using detection signals of the respective phase difference detection pixels 52A and 52B disposed in the block is described.

As a modification example of the block, three or more pixel lines including phase detection pixels disposed in the AF area 53 may be used as one block, and the reliability determination values J1 and J2 may be generated using detection signals of the respective phase difference detection pixels 52A and 52B disposed in the block. Hereinafter, a modification example of the array of the phase difference detection pixels in the block will be described.

(First Modification Example of Array)

Figure 14:
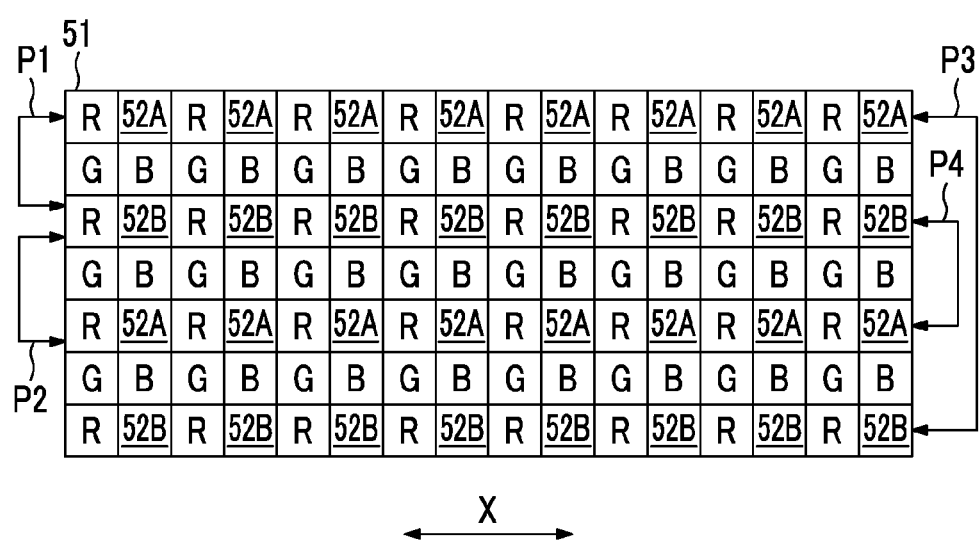
FIG. 14 is a diagram illustrating a modification example of an array of phase difference detection pixels 52A and 52B which are positioned at the AF area 53 of a solid-state imaging element 5 shown in FIG. 1.

FIG. 14 is a diagram illustrating a modification example of the array of the phase difference detection pixels 52A and 52B which are positioned in the AF area 53 of the solid-state imaging element 5 shown in FIG. 1.

In the array example shown in FIG. 14, two phase difference pixel lines that include plural phase difference detection pixels 52A arranged in the row direction X, and two phase difference pixel lines that include plural phase difference detection pixels 52B arranged in the row direction X are provided in the AF area 53, and reliability determination is performed using the four phase difference pixel lines as one block. In the following description of FIG. 14, for ease of description, it is assumed that the upward direction and the downward direction represent a vertical direction in the figure.

In one block shown in FIG. 14, respective phase difference detection pixels included in phase difference pixel lines in odd-numbered rows are the phase difference detection pixels 52A, and respective phase difference detection pixels included in phase difference pixel lines in even-numbered rows are the phase difference detection pixels 52B.

In the array example shown in FIG. 14, each phase difference detection pixel 52A in the phase difference pixel line in the first row in the block and each phase difference detection pixel 52B disposed at a one-pixel interval with respect to each phase difference detection pixel 52A in the downward direction form a pixel pair P1.

Further, each phase difference detection pixel 52A in the phase difference pixel line in the third-row in the block and each phase difference detection pixel 52B disposed at a one-pixel interval with respect to each phase difference detection pixel 52A in the upward direction form a pixel pair P2.

Further, each phase difference detection pixel 52A in the first-row phase difference pixel line in the block and each phase difference detection pixel 52B disposed at a five-pixel interval with respect to each phase difference detection pixel 52A in the downward direction form a pixel pair P3.

Further, each phase difference detection pixel 52A in the third-row phase difference pixel line in the block and each phase difference detection pixel 52B disposed at a one-pixel interval with respect to each phase difference detection pixel 52A in the upward direction form a pixel pair P4.

According to the array example of FIG. 14, since the array is an array of phase difference detection pixels which is generally used, the array may be easily applied to a known solid-state imaging element, which enhances versatility.

(Second Modification Example of Array)

Figure 15:
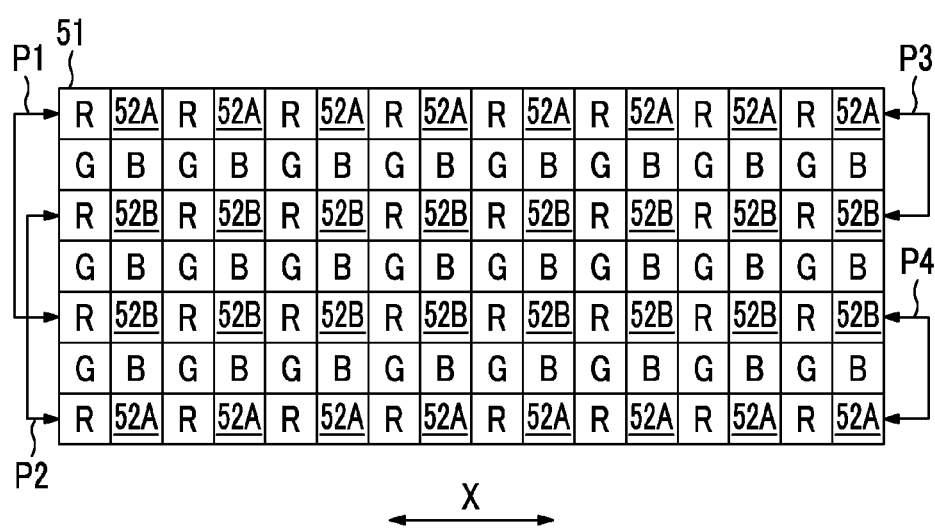
FIG. 15 is a diagram illustrating a modification example of the array of the phase difference detection pixels 52A and 52B which are positioned at the AF area 53 of the solid-state imaging element 5 shown in FIG. 1.

FIG. 15 is a diagram illustrating a modification example of the array of the phase difference detection pixels 52A and 52B which are positioned at the AF area 53 of the solid-state imaging element 5 shown in FIG. 1.

In the array example shown in FIG. 15, two phase difference pixel lines that include plural phase difference detection pixels 52A arranged in the row direction X, and two phase difference pixel lines that include plural phase difference detection pixels 52B arranged in the row direction X are provided in the AF area 53, and reliability determination is performed using the four phase difference pixel lines as one block.

In one block shown in FIG. 15, each phase difference pixel included in phase difference pixel lines in the first row and the fourth row is the phase difference detection pixel 52A, and each phase difference pixel included in phase difference pixel lines in the second row and the third row is the phase difference detection pixel 52B.

In the array example shown in FIG. 15, each phase difference detection pixel 52A in the phase difference pixel line in the first row in the block and each phase difference detection pixel 52B disposed at a three-pixel interval with respect to each phase difference detection pixel 52A in the downward direction form a pixel pair P1.

Further, each phase difference detection pixel 52A in the phase difference pixel line in the fourth row in the block and each phase difference detection pixel 52B disposed at a three-pixel interval with respect to each phase difference detection pixel 52A in the upward direction form a pixel pair P2.

Further, each phase difference detection pixel 52A in the phase difference pixel line in the first row in the block and each phase difference detection pixel 52B disposed at a one-pixel interval with respect to each phase difference detection pixel 52A in the downward direction form a pixel pair P3.

Further, each phase difference detection pixel 52A in the phase difference pixel line in the fourth row in the block and each phase difference detection pixel 52B disposed at a one-pixel interval with respect to each phase difference detection pixel 52A in the upward direction form a pixel pair P4.

According to the array example shown in FIG. 15, since the pixel pairs P1 and P2, and the pixel pairs P3 and P4 have the same distance between two phase difference detection pixels that form each pixel pair, respectively, it is possible to perform the reliability determination with high accuracy, compared with the example shown in FIG. 14.

Further, since the distance between two phase difference pixels that form the pixel pair corresponds to three pixels at most, it is possible to perform the reliability determination with high accuracy, compared with the example shown in FIG. 14.

(Third Modification Example of Array)

Figure 16:
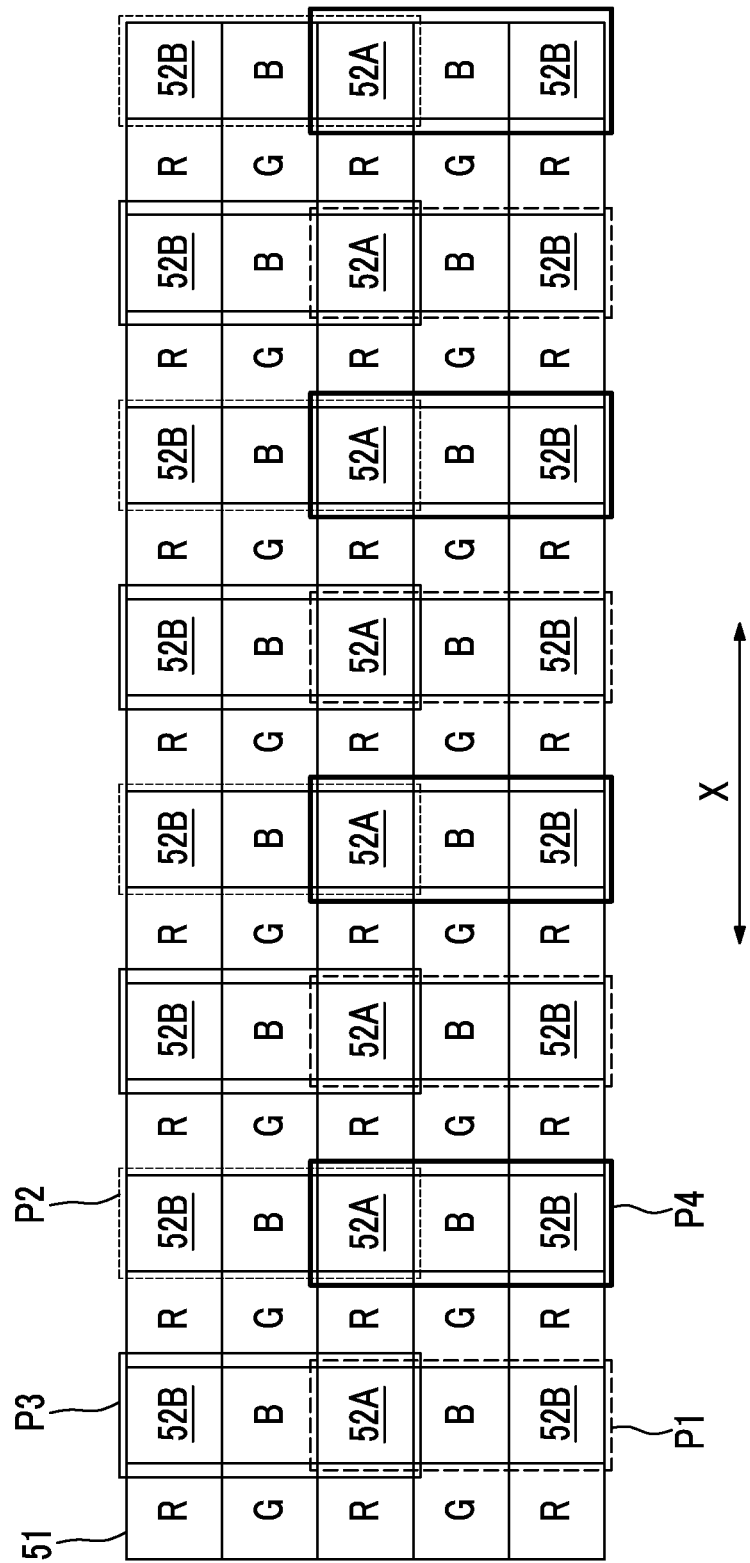
FIG. 16 is a diagram illustrating a modification example of the array of the phase difference detection pixels 52A and 52B which are positioned at the AF area 53 of the solid-state imaging element 5 shown in FIG. 1.

FIG. 16 is a diagram illustrating a modification example of the array of the phase difference detection pixels 52A and 52B which are positioned at the AF area 53 of the solid-state imaging element 5 shown in FIG. 1.

In the array example shown in FIG. 16, two phase difference pixel lines including plural phase difference detection pixels 52B arranged in the row direction X, and one phase difference pixel line including plural phase difference detection pixels 52A arranged in the row direction X are provided in the AF area 53, and the reliability determination is performed using the three phase difference pixel lines as one block.

In the array example shown in FIG. 16, each phase difference detection pixel 52A disposed in an odd column among the phase difference detection pixels 52A in the phase difference pixel line in the second row in the block and each phase difference detection pixel 52B disposed at a one-pixel interval with respect to each phase difference detection pixel 52A in the downward direction form a pixel pair P1.

Each phase difference detection pixel 52A disposed in an even column among the phase difference detection pixels 52A in the phase difference pixel line in the second row in the block and each phase difference detection pixel 52B disposed at a one-pixel interval with respect to each phase difference detection pixel 52A in the upward direction form a pixel pair P2.

Each phase difference detection pixel 52A disposed in an odd column among the phase difference detection pixels 52A in the phase difference pixel line in the second row in the block and each phase difference detection pixel 52B disposed at a one-pixel interval with respect to each phase difference detection pixel 52A in the upward direction form a pixel pair P3.

Each phase difference detection pixel 52A disposed in an even column among the phase difference detection pixels 52A in the phase difference pixel line in the second row in the block and each phase difference detection pixel 52B disposed at a one-pixel interval with respect to each phase difference detection pixel 52A in the upward direction form a pixel pair P4.

According to the array example shown in FIG. 16, since the reliability determination is performed using three phase difference pixel lines as one block, it is possible to reduce the number of phase difference pixel lines used for the reliability determination compared with that in the array examples of FIGS. 14 and 15.

Further, since the pixel pairs P1 and P2, and the pixel pairs P3 and P4 have the same distance between two phase difference detection pixels that form each pixel pair, respectively, it is possible to perform the reliability determination with high accuracy, compared with the example shown in FIG. 14.

Further, since the distance between two phase difference detection pixels that form each pixel pair corresponds to one pixel at most, it is possible to perform the reliability determination with high accuracy, compared with the examples shown in FIGS. 14 and 15.

(Fourth Modification Example of Array)

Figure 17:
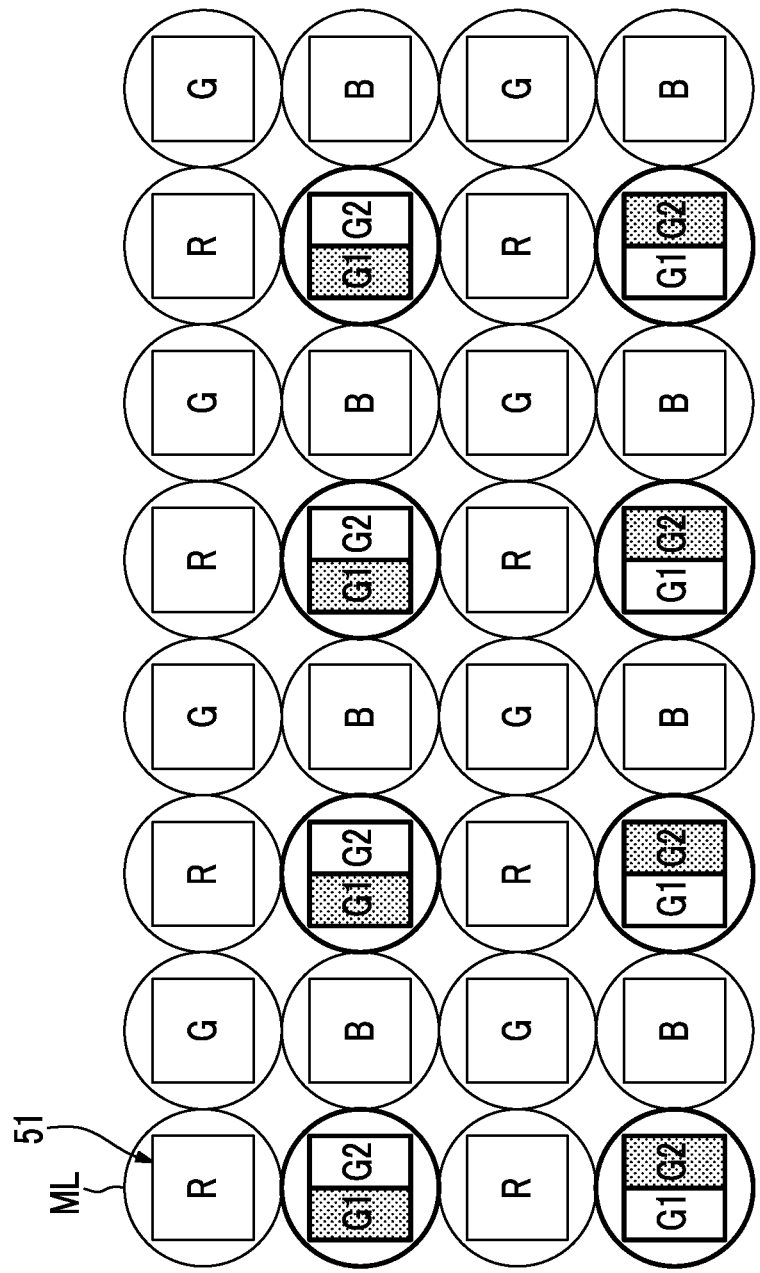
FIG. 17 is a diagram illustrating a modification example of the array of the phase difference detection pixels 52A and 52B which are positioned at the AF area 53 of the solid-state imaging element 5 shown in FIG. 1.

FIG. 17 is a diagram illustrating a modification example of the configuration of the AF area 53 of the solid-state imaging element 5 shown in FIG. 1.

In the array example shown in FIG. 17, a photoelectric conversion portion of each of some G pixels 51 disposed in the AF area 53 is divided into two parts, in which the left part ("G1" pixel) among the two-divided parts of the photoelectric conversion portion is set as the phase difference detection pixel 52A, and the right part ("G2" pixel) among the two-divided pixels is set as the phase difference detection pixel 52B.

One micro lens 51 is provided in each pixel 51, and one micro lens 51 is also provided over the phase difference detection pixel 52A and the phase difference detection pixel 52B obtained by dividing the photoelectric conversion portion of one pixel 51 into two parts.

Thus, a configuration in which the phase difference detection pixel 52A receives a beam that passes through a half of a pupil region of the imaging lens 1, and the phase difference detection pixel 52B receives a beam that passes through the remaining half of the pupil region of the imaging lens 1 is obtained.

In this array example, two phase difference pixel lines where the pixels 51 that includes the phase difference detection pixel 52A and the phase difference detection pixel 52B are arranged in the row direction X are provided in the column direction Y, in the AF area 53, and the reliability determination is performed using the two phase difference pixel lines as one block. In the block, the micro lenses ML disposed at the same position in the row direction X are all disposed at such close positions as to receive a beam from the same subject.

In the array example shown in FIG. 17, each phase difference detection pixel 52A (shaded pixel in the figure) in the phase difference pixel line in the first row in the block and the phase difference detection pixel 52B (shaded pixel in the figure) in the phase difference pixel line in the second row disposed on a diagonally lower right side with respect to each phase difference detection pixel 52A are set as a pixel pair P1.

Further, each phase difference detection pixel 52A (non-shaded pixel in the figure) in the phase difference pixel line in the second row in the block and the phase difference detection pixel 52B (non-shaded pixel in the figure) in the phase difference pixel line in the first row disposed on a diagonally upper right side with respect to each phase difference detection pixel 52A are set as a pixel pair P2.

Further, each phase difference detection pixel 52A in the phase difference pixel line in the first row in the block and the phase difference detection pixel 52B rightward adjacent to each phase difference detection pixel 52A are set as a pixel pair P3.

In addition, each phase difference detection pixel 52A in the phase difference pixel line in the second row in the block and the phase difference detection pixel 52B rightward adjacent to each phase difference detection pixel 52A are set as a pixel pair P4.

In the array shown in FIG. 17, when the pixel 51 divided into the phase difference detection pixel 52A and the phase difference detection pixel 52B is used as an imaging pixel, a signal obtained by adding a detection signal of the phase difference detection pixel 52A to a detection signal of the phase difference detection pixel 52B may be considered as a signal output from the pixel 51.

Further, in the array shown in FIG. 17, a configuration in which the entire pixels 51, instead of some G pixels 51, are divided into two parts may be used. In this case, it is possible to change pixel pairs used for the reliability determination according to colors of subjects, to thereby perform the phase difference AF with high accuracy.

In addition, in the configuration in which the entire pixels 51 are divided into two parts, it is also possible to perform the reliability determination for each color, and to perform the phase difference AF using phase difference detection pixels of colors for which high reliability is obtained, and thus, it is possible to increase a possibility that the phase difference AF is performed, or to enhance the accuracy of the phase difference AF.

According to the array example shown in FIG. 17, since a configuration in which the phase difference detection pixel 52A and the phase difference detection pixel 52B are provided under one micro lens ML is used, it is possible to increase the number of imaging pixels, compared with a configuration in which the micro lens ML is individually provided for the phase difference detection pixel 52A and the phase difference detection pixel 52B.

Further, in imaging, since signals from the phase difference detection pixel 52A and the phase difference detection pixel 52B disposed at the approximately the same position are added to obtain a signal corresponding to one pixel, a pixel interpolation process is not necessary, to thereby make it possible to enhance the quality of a captured image.

In this description, an example in which the digital camera is used as the image capture device is shown, but hereinafter, an embodiment in which a smart phone with a camera is used as the image capture device will be described.

Figure 18:
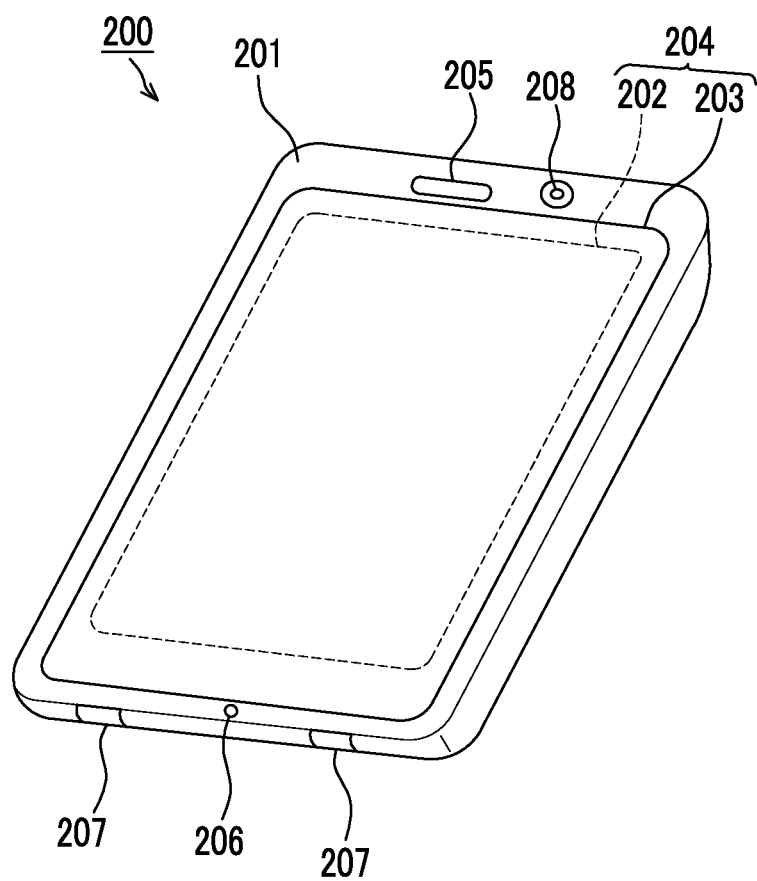
FIG. 18 is a diagram illustrating a smart phone which is an image capture device.

FIG. 18 is a diagram illustrating an appearance of a smart phone 200 which is an embodiment of the image capture device of the invention. The smart phone 200 shown in FIG. 18 includes a flat housing 201, and a display input unit 204 that is disposed on one surface of the housing 201 and includes a display panel 202 which is a display unit and an operation panel 203 which is an input unit, in which the display panel and the operation panel are integrally formed. Further, in the housing 201, a speaker 205, a microphone 206, an operation unit 207, and a camera unit 208 are provided. The configuration of the housing 201 is not limited thereto, and for example, a configuration in which the display unit and the input unit are independently provided may be employed, or a configuration in which a folding structure or a slide mechanism is provided may be employed.

Figure 19:
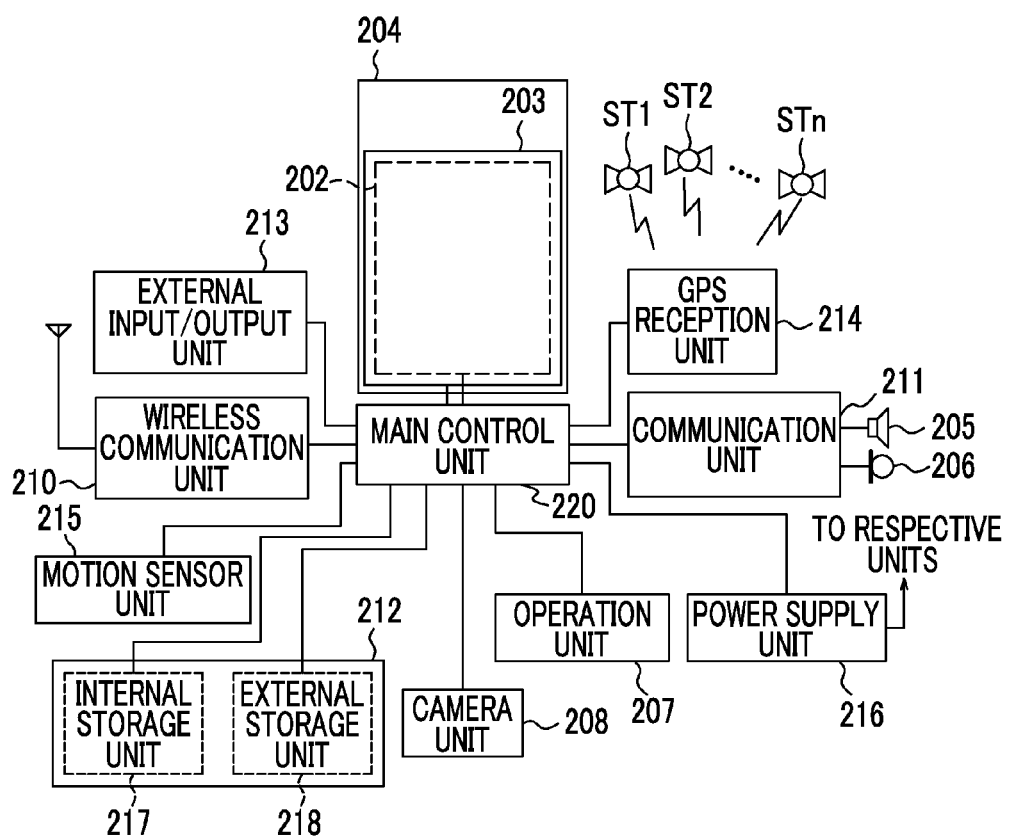
FIG. 19 is an internal block diagram of the smart phone shown in FIG. 18.

FIG. 19 is a block diagram illustrating a configuration of the smart phone 200 shown in FIG. 18. As shown in FIG. 18, as main components of the smart phone, a wireless communication unit 210, the display input unit 204, a communication unit 211, the operation unit 207, the camera unit 208, a storage unit 212, and an external input/output unit 213, a global positioning system (GPS) receiving unit 214, a motion sensor 215, a power source 216, and a main control unit 220 are provided. Further, as main functions of the smart phone 200, a wireless communication function for performing mobile wireless communication through a base station BS (not shown) and a mobile communication network NW (not shown) is provided.

The wireless communication unit 210 performs wireless communication with the base station BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (static image and moving image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OLED), or the like as a display device.

The operation panel 203 is a device that is mounted so that an image displayed on a display surface of the display panel 202 can be visually recognized and detects one or plural coordinates operated by a user's finger or a stylus. If the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 18, the display panel 202 and the operation panel 203 of the smart phone 200 shown as an example of the image capture device of the invention are integrated to form the display input unit 204, in which the operation panel 203 is arranged to completely cover the display panel 202.

When such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an inductive coupling type, an electromagnetic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 18, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user.

For example, as shown in FIG. 18, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable memory slot. Each of the respective internal storage section 217 and the external storage section 218 that form the storage unit 212 is realized using a storage medium such as a flash memory, a hard disk, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As the external device connected to the smart phone 200, for example, a wired or wireless headset, a wired or wireless external charger, a wired or wireless data port, a memory card, a subscriber identity module card (SIM) or a user identity module card (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mail, a Web browsing function for browsing Web pages, or the like is used.

Further, the main control unit 220 has an image processing function, for example, for displaying an image on the display input unit 204 based on image data (data on a static image or a moving image) such as received data or downloaded streaming data. The image processing function refers to a function for decoding the image data by the main control unit 220, performing image processing with respect to the decoded image data, and displaying an image on the display input unit 204.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1.

The captured image data generated by the camera unit 208 may be recorded in the storage unit 212, or may be output through the input/output unit 213 or the wireless communication unit 210.

In the smart phone 200 shown in FIG. 18, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203.

Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor 215, or the like may be added to the image data on a static image or a moving image, and the result may be recorded in the storage unit 212, or may be output through the input/output unit 213 or the wireless communication unit 210.

In the smart phone 200 with the above-described configuration, similarly, by using the solid-state imaging element 5 as the imaging element of the camera unit 208, and by performing the processes shown in FIGS. 5 and 10 in the main control unit 220, it is possible to perform the contrast AF in which both the focusing speed and the focusing accuracy are achieved.

As described above, this specification discloses the following content.

According to a disclosure, there is provided an image capture device that includes an imaging element that images a subject through an imaging optical system including a focus lens, in which the imaging element includes a first signal detection unit that detects a signal based on one beam among a pair of beams that passes through different portions in a pupil region of the imaging optical system, and a second signal detection unit that detects a signal based on the other beam among the pair of beams, and the image capture device includes: a focus control unit that performs any one of a first focus control for moving the focus lens to a focusing position determined based on detection signals of the first signal detection unit and the second signal detection unit and a second focus control for moving the focus lens along an optical axis direction by an arbitrary distance in a predetermined movement range and moving the focus lens to a focusing position determined based on contrast of images captured by the imaging element at respective movement positions; a focus control determination unit that determines which one of the first focus control and the second focus control is to be performed based on information generated using the detection signals of the first signal detection unit and the second signal detection unit; and a control unit that variably controls, in the case where it is determined that the second focus control is to be performed, at least the arbitrary distance, among the movement range and the arbitrary distance in the movement range, based on the information.

According to this configuration, for example, in the case where it can be determined that a main subject is not a high-frequency subject from the information generated using the detection signals of the first signal detection unit and the second signal detection unit, it is possible to increase the focusing speed based on the contrast AF method by increasing the arbitrary distance. Further, in the case where it can be determined that the main subject is the high-frequency subject from the information generated using the detection signals of the first signal detection unit and the second signal detection unit, it is possible to enhance the focusing accuracy based on the contrast AF method by reducing the arbitrary distance. In this way, compared with a case where the arbitrary distance is constantly fixed, it is possible to achieve compatibility of the focusing accuracy and the focusing speed based on the contrast AF method.

The above-disclosed image capture device further includes: an information generation unit that generates, based on correlation operation results between detection signals from a first signal detection unit and detection signals from a second signal detection unit, output from a first pair of the first signal detection unit group including the plurality of first signal detection units arranged along a phase difference detection direction in the first signal detection unit and the second signal detection unit and a signal detection unit group including the second signal detection units arranged at the same distance in a direction orthogonal to the phase difference detection direction with respect to the respective signal detection units of the first signal detection unit group, and based on correlation operation results between detection signals from the first signal detection unit and detection signals from the second signal detection unit, output from a second pair of the second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in a direction opposite to a direction orthogonal to the phase difference detection direction with respect to the respective signal detection units of the second signal detection unit group, a reliability determination value for determining reliability of the correlation operation results as the information, in which the focus control determination unit determines which one of the first focus control and the second focus control is to be performed according to the size of the reliability determination value, and the control unit determines, in the case where it is determined that the second focus control is to be performed, a factor for the determination that the second focus control is to be performed according to the size of the reliability determination value, and reduces, in the case where the factor is based on a frequency of a subject image, the arbitrary distance compared with a case where the factor is not based on the frequency of the subject image.

According to this configuration, in the case where the factor is based on the frequency of the subject image, since the arbitrary distance is short, it is possible to determine the focusing position with high accuracy. Further, in the case where the factor is not based on the frequency of the subject image, since the arbitrary distance is long, it is possible to focus on the subject at high speed.

In the above-disclosed image capture device, in the case where the factor is not based on the frequency of the subject image, the reliability of the correlation operation results based on the reliability determination value is equal to or greater than a first threshold value, and phase differences which are the correlation operation results are equal to or greater than a second threshold value, the control unit increases the arbitrary distance, compared with a case where the factor is not based on the frequency of the subject image, the reliability of the correlation operation results based on the reliability determination value is smaller than the first threshold value, or compared with a case where the factor is not based on the frequency of the subject image, the reliability of the correlation operation results based on the reliability determination value is equal to or greater than the first threshold value, and the phase differences are smaller than the second threshold value.

According to this configuration, in the case where the reliability of the correlation operation results is high, since the arbitrary distance is increased in the case where the phase differences which are the correlation operation results are equal to or greater than the second threshold value, it is possible to determine the focusing position at high speed, and to focus on the subject at high speed.

In the above image capture device, in the case where the factor is not based on the frequency of the subject image and the reliability of the correlation operation results based on the reliability determination value is equal to or greater than the first threshold value, the control unit narrows the movement range compared with a maximum range where the focus lens is movable.

According to this configuration, in the case where the reliability of the correlation operation results is high, since the movement range of the focus lens is narrowed, it is possible to reduce a movement distance of the focus lens, compared with a case where the movement range is constantly the maximum range where the focus lens is movable, to thereby achieve high-speed AF.

In the above-disclosed image capture device, in the case where the factor is based on the frequency of the subject image, the control unit narrows the movement range compared with the maximum range where the focus lens is movable.

According to this configuration, in the case where the reliability of the correlation operation results is low due to the factor of the high-frequency subject, since the movement range of the focus lens is narrowed, it is possible to reduce a movement distance of the focus lens, to thereby achieve high-speed AF.

The above-disclosed image capture device further includes: an information generation unit that generates, based on a ratio between an integrated value of detection signals of the first signal detection units and an integrated value of detections signals of the second signal detection units, output from a first pair of a first signal detection unit group including the plurality of first signal detection units arranged along a phase difference detection direction in the first signal detection unit and the second signal detection unit and a signal detection unit group including the second signal detection units arranged at the same distance in a direction orthogonal to the phase difference detection direction with respect to the respective signal detection units of the first signal detection unit group, and based on a ratio between an integrated value of detection signals of the first signal detection units and an integrated value of detections signals of the second signal detection units, output from a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in a direction opposite to a direction orthogonal to the phase difference detection direction with respect to the respective signal detection units of the second signal detection unit group, a reliability determination value for determining reliability of the first focus control performed using the detection signals of the respective signal detection units of the first pair and the second pair as the information.

According to this configuration, it is possible to determine which one of the first focus control and the second focus control is to be performed without performing a correlation operation, or to variably control the distance in an arbitrary way. Thus, it is possible to reduce computation to thereby reduce power consumption, or to reduce time for determining which one of the first focus control and the second focus control is to be performed to thereby realize high-speed AF.

In the above-disclosed image capture device, the focus control determination unit determines which one of the first focus control and the second focus control is to be performed according to the size of the reliability determination value, and the control unit determines, in the case where it is determined that the second focus control is to be performed, a factor for the determination that the second focus control is to be performed according to the size of the reliability determination value, and reduces, in the case where the factor is based on the frequency of the subject image, the arbitrary distance compared with a case where the factor is not based on the frequency of the subject image.

According to this configuration, for example, in the case where a main subject is a high-frequency subject and the reliability based on the reliability determination value is low, since the arbitrary distance is short, it is possible to acquire an evaluation value of the contrast AF in minute steps, to thereby enhance the accuracy of the focus control based on the contrast AF method. Further, in the case where the reliability based on the reliability determination value is high, since the arbitrary distance is long, it is possible to increase the speed of the focus control.

In the above-disclosed image capture device, in the case where it is determined that the second focus control is to be performed, the focus control unit determines an execution priority of a first algorithm for focusing position determination for focusing on a subject of which a component in the phase difference detection direction is a main component and a second algorithm for focusing position determination for focusing a subject of which a component in a direction orthogonal to the phase difference detection direction is a main component according to the size of the reliability determination value.

According to this configuration, for example, in the case of the main subject of which the component in the phase difference detection direction is the main component, by executing only the first algorithm, or by executing the second algorithm after the first algorithm is preferentially executed to determine the focusing position, it is possible to enhance the focusing accuracy.

The above-disclosed image capture device further includes: a reliability determination value generation unit that generates, based on a ratio between an integrated value of detection signals of the first signal detection units and an integrated value of detections signals of the second signal detection units, output from a first pair of a first signal detection unit group including the plurality of first signal detection units arranged along a phase difference detection direction in the first signal detection unit and the second signal detection unit and a signal detection unit group including the second signal detection units arranged at the same distance in the same direction with respect to the respective signal detection units of the first signal detection unit group, and based on a ratio between an integrated value of detection signals of the first signal detection units and an integrated value of detections signals of the second signal detection units, output from a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in a direction different from the same direction with respect to the respective signal detection units of the second signal detection unit group, a reliability determination value for determining reliability of the first focus control performed using the detection signals of the respective signal detection units of the first pair and the second pair, in which in a video mode where focusing is continued with respect to a main subject, the focus control determination unit causes the reliability determination value generation unit to generate the reliability determination value after the second focus control is terminated, and performs, in the case where the reliability of the first focus control based on the reliability determination value is smaller than a threshold value, the second focus control again.

In the above-disclosed image capture device, the imaging element includes a plurality of signal detection unit pairs of the first signal detection units and the second signal detection units arranged in a direction that intersects the detection direction with respect to the first signal detection units, the plurality of signal detection unit pairs include a first signal detection unit pair and a second signal detection unit pair in which positional relationships between the first signal detection units and the second signal detection units are reverse to each other, the imaging element includes a plurality of pair lines in which the first signal detection unit pair and the second signal detection unit pair are alternately arranged in the detection direction, and the information generation unit sets the first signal detection unit pair included in an arbitrary pair line as the first pair and sets the second signal detection unit pair included in the arbitrary pair line as the second pair, or sets, in a state where the signal detection units included in the arbitrary pair line are divided into two groups including the signal detection units disposed at the same position in a direction orthogonal to the detection direction, one group as the first pair and sets the other group as the second pair, to calculate the reliability determination value.

According to this configuration, it is possible to calculate the reliability determination value using detection signals of the signal detection units included in two lines which are closest to each other, among the lines including the signal detection units, and thus, it is possible to minimize the number of lines which are detection signal reading targets for generation of the reliability determination value, to thereby reduce time until the focusing is completed.

A focus control method in an image capture device that includes an imaging element that images a subject through an imaging optical system including a focus lens, in which the imaging element includes a first signal detection unit that detects a signal based on one beam among a pair of beams that passes through different portions in a pupil region of the imaging optical system, and a second signal detection unit that detects a signal based on the other beam among the pair of beams, and the focus control method includes: a focus control step of performing any one of a first focus control for moving the focus lens to a focusing position determined based on detection signals of the first signal detection unit and the second signal detection unit and a second focus control for moving the focus lens along an optical axis direction by an arbitrary distance in a predetermined movement range and moving the focus lens to a focusing position determined based on contrast of images captured by the imaging element at respective movement positions; a focus control determination step of determining which one of the first focus control and the second focus control is to be performed based on information generated using the detection signals of the first signal detection unit and the second signal detection unit; and a control step of variably controlling, in the case where it is determined that the second focus control is to be performed, at least the arbitrary distance, among the movement range and the arbitrary distance in the movement range, based on the information.

According to this method, for example, in the case where it can be determined that a main subject is not a high-frequency subject from the information generated using the detection signals of the first signal detection unit and the second signal detection unit, it is possible to increase the focusing speed based on the contrast AF method by increasing the arbitrary distance. Further, in the case where it can be determined that the main subject is the high-frequency subject from the information generated using the detection signals of the first signal detection unit and the second signal detection unit, it is possible to enhance the focusing accuracy based on the contrast AF method by decreasing the arbitrary distance. In this way, compared with a case where the arbitrary distance is constantly fixed, it is possible to achieve compatibility of the focusing accuracy and the focusing speed based on the contrast AF method.

The above-disclosed focus control method further includes: an information generation step of generating, based on correlation operation results between detection signals from a first signal detection unit and detection signals from a second signal detection unit, output from a first pair of the first signal detection unit group including the plurality of first signal detection units arranged along a phase difference detection direction in the first signal detection unit and the second signal detection unit and a signal detection unit group including the second signal detection units arranged at the same distance in a direction orthogonal to the phase difference detection direction with respect to the respective signal detection units of the first signal detection unit group, and based on correlation operation results between detection signals from the first signal detection unit and detection signals from the second signal detection unit, output from a second pair of the second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in a direction opposite to a direction orthogonal to the phase difference detection direction with respect to the respective signal detection units of the second signal detection unit group, a reliability determination value for determining reliability of the correlation operation results as the information, in which in the focus control determination step, it is determined which one of the first focus control and the second focus control is to be performed according to the size of the reliability determination value, and in the control step, in the case where it is determined that the second focus control is to be performed, a factor for the determination that the second focus control is to be performed is determined according to the size of the reliability determination value, and in the case where the factor is based on a frequency of a subject image, the arbitrary distance is reduced compared with a case where the factor is not based on the frequency of the subject image.

The above-disclosed focus control method further includes: an information generation step of generating, based on a ratio between an integrated value of detection signals of the first signal detection units and an integrated value of detections signals of the second signal detection units, output from a first pair of a first signal detection unit group including the plurality of first signal detection units arranged along a phase difference detection direction in the first signal detection unit and the second signal detection unit and a signal detection unit group including the second signal detection units arranged at the same distance in a direction orthogonal to the phase difference detection direction with respect to the respective signal detection units of the first signal detection unit group, and based on a ratio between an integrated value of detection signals of the first signal detection units and an integrated value of detections signals of the second signal detection units, output from a second pair of a second signal detection unit group including the plurality of first signal detection units arranged at the same distance in the same direction with respect to the respective signal detection units of the first signal detection unit group and arranged along the detection direction and a signal detection unit group including the second signal detection units arranged at the same distance in a direction opposite to a direction orthogonal to the phase difference detection direction with respect to the respective signal detection units of the second signal detection unit group, a reliability determination value for determining reliability of the first focus control performed using the detection signals of the respective signal detection units of the first pair and the second pair as the information.

INDUSTRIAL APPLICABILITY

The present invention is applied in a digital camera or the like to provide high convenience and effectiveness.

EXPLANATION OF REFERENCES

1: imaging lens
2: diaphragm
5: solid-state imaging element
11: system control unit (focus control unit, focus control determination unit, control unit)
18: contrast AF processing unit
19: phase difference AF processing unit (information generation unit, reliability determination value generation unit)
50: light receiving surface
51: pixel
52, 52A, 52: phase difference detection pixel 53: AF area
P1, P2, P3, P4: pixel pair

What is claimed is:

1. An image capture device that includes an imaging element that images a subject through an imaging optical system including a focus lens, the imaging element including a first signal detector that detects a signal based on one beam among a pair of beams that passes through different portions in a pupil region of the imaging optical system, and a second signal detector that detects a signal based on the other beam among the pair of beams, and the image capture device comprising:
   a focus controller that performs any one of a first focus control for moving the focus lens to a focusing position determined based on detection signals of the first signal detector and the second signal detector and a second focus control for moving the focus lens along an optical axis direction by an arbitrary distance in a predetermined movement range and moving the focus lens to a focusing position determined based on contrast of images captured by the imaging element at respective movement positions;
   a focus control determinator that determines which one of the first focus control and the second focus control is to be performed based on information generated using the detection signals of the first signal detector and the second signal detector;
   a controller that variably controls, in the case where it is determined that the second focus control is to be performed, at least the arbitrary distance, among the movement range and the arbitrary distance in the movement range, based on the information; and
   an information generator that generates, based on correlation operation results between detection signals from the first signal detector and detection signals from the second signal detector, output from a first pair of a first signal detector group including a plurality of first signal detectors arranged along a phase difference detection direction in the first signal detector and the second signal detector and a third signal detector group including the second signal detectors arranged at the same distance in a direction orthogonal to the phase difference detection direction with respect to the respective signal detectors of the first signal detector group, and based on correlation operation results between detection signals from the first signal detector and detection signals from the second signal detector, output from a second pair of a second signal detector group including a plurality of first signal detectors arranged at the same distance in the same direction with respect to the respective signal detectors of the first signal detector group and arranged along the detection direction and fourth signal detector group including the second signal detectors arranged at the same distance in a direction opposite to a direction orthogonal to the phase difference detection direction with respect to the respective signal detectors of the second signal detector group, a reliability determination value for determining reliability of the correlation operation results as the information,
   wherein the focus control determinator determines which one of the first focus control and the second focus control is to be performed according to the size of the reliability determination value, and
   wherein the controller determines, in the case where it is determined that the second focus control is to be performed, a factor for the determination that the second focus control is to be performed according to the size of the reliability determination value, and reduces, in the case where the factor is based on a frequency of a subject image, the arbitrary distance compared with a case where the factor is not based on the frequency of the subject image.

2. The image capture device according to claim 1, wherein in the case where the factor is not based on the frequency of the subject image, the reliability of the correlation operation results based on the reliability determination value is equal to or greater than a first threshold value, and phase differences which are the correlation operation results are equal to or greater than a second threshold value, the controller increases the arbitrary distance, compared with a case where the factor is not based on the frequency of the subject image, the reliability of the correlation operation results based on the reliability determination value is smaller than the first threshold value, or compared with a case where the factor is not based on the frequency of the subject image, the reliability of the correlation operation results based on the reliability determination value is equal to or greater than the first threshold value, and the phase differences are smaller than the second threshold value.

3. The image capture device according to claim 1, wherein in the case where the factor is not based on the frequency of the subject image and the reliability of the correlation operation results based on the reliability determination value is equal to or greater than the first threshold value, the controller narrows the movement range compared with a maximum range where the focus lens is movable.

4. The image capture device according to claim 2, wherein in the case where the factor is not based on the frequency of the subject image and the reliability of the correlation operation results based on the reliability determination value is equal to or greater than the first threshold value, the controller narrows the movement range compared with a maximum range where the focus lens is movable.

5. The image capture device according to claim 1, wherein in the case where the factor is based on the frequency of the subject image, the controller narrows the movement range compared with the maximum range where the focus lens is movable.

6. The image capture device according to claim 2, wherein in the case where the factor is based on the frequency of the subject image, the controller narrows the movement range compared with the maximum range where the focus lens is movable.

7. The image capture device according to claim 3, wherein in the case where the factor is based on the frequency of the subject image, the controller narrows the movement range compared with the maximum range where the focus lens is movable.

8. The image capture device according to claim 4, wherein in the case where the factor is based on the frequency of the subject image, the controller narrows the movement range compared with the maximum range where the focus lens is movable.

9. An image capture device that includes an imaging element that images a subject through an imaging optical system including a focus lens, the imaging element including a first signal detector that detects a signal based on one beam among a pair of beams that passes through different portions in a pupil region of the imaging optical system, and a second signal detector that detects a signal based on the other beam among the pair of beams, and the image capture device comprising:
- a focus controller that performs any one of a first focus control for moving the focus lens to a focusing position determined based on detection signals of the first signal detector and the second signal detector and a second focus control for moving the focus lens along an optical axis direction by an arbitrary distance in a predetermined movement range and moving the focus lens to a focusing position determined based on contrast of images captured by the imaging element at respective movement positions;
- a focus control determinator that determines which one of the first focus control and the second focus control is to be performed based on information generated using the detection signals of the first signal detector and the second signal detector;
- a controller that variably controls, in the case where it is determined that the second focus control is to be performed, at least the arbitrary distance, among the movement range and the arbitrary distance in the movement range, based on the information; and
- an information generator that generates, based on a ratio between an integrated value of detection signals of the first signal detectors and an integrated value of detections signals of the second signal detectors, output from a first pair of a first signal detector group including a plurality of first signal detectors arranged along a phase difference detection direction in the first signal detector and the second signal detector and a third signal detector group including the second signal detectors arranged at the same distance in a direction orthogonal to the phase difference detection direction with respect to the respective first signal detectors of the first signal detector group, and based on a ratio between an integrated value of detection signals of the first signal detectors and an integrated value of detections signals of the second signal detectors, output from a second pair of a second signal detector group including a plurality of first signal detector arranged at the same distance in the same direction with respect to the respective signal detectors of the first signal detector group and arranged along the detection direction and a fourth signal detector group including the second signal detectors arranged at the same distance in a direction opposite to a direction orthogonal to the phase difference detection direction with respect to the respective signal detectors of the second signal detector group, a reliability determination value for determining reliability of the first focus control performed using the detection signals of the respective signal detectors of the first pair and the second pair as the information.

10. The image capture device according to claim 9,
wherein the focus control determinator determines which one of the first focus control and the second focus control is to be performed according to the size of the reliability determination value, and
wherein the controller determines, in the case where it is determined that the second focus control is to be performed according to the size of the reliability determination value, a factor for the determination that the second focus control is to be performed, and reduces, in the case where the factor is based on the frequency of the subject image, the arbitrary distance compared with a case where the factor is not based on the frequency of the subject image.

11. The image capture device according to claim 9,
wherein in the case where it is determined that the second focus control is to be performed, the focus controller determines an execution priority of a first algorithm for focusing position determination for focusing on a subject of which a component in the phase difference detection direction is a main component and a second algorithm for focusing position determination for focusing a subject of which a component in a direction orthogonal to the phase difference detection direction is a main component according to the size of the reliability determination value.

12. The image capture device according to claim 10,
wherein in the case where it is determined that the second focus control is to be performed, the focus controller determines an execution priority of a first algorithm for focusing position determination for focusing on a subject of which a component in the phase difference detection direction is a main component and a second algorithm for focusing position determination for focusing a subject of which a component in a direction orthogonal to the phase difference detection direction is a main component according to the size of the reliability determination value.

13. The image capture device according to claim 1, further comprising:
a reliability determination value generator that generates, based on a ratio between an integrated value of detection signals of the first signal detectors and an integrated value of detections signals of the second signal detectors, output from the first pair of the first signal detector group including the plurality of first signal detectors arranged along the phase difference detection direction in the first signal detector and the second signal detector and the third signal detector group including the second signal detectors arranged at the same distance in the same direction with respect to the respective signal detectors of the first signal detector group, and based on a ratio between an integrated value of detection signals of the first signal detectors and an integrated value of detections signals of the second signal detectors, output from the second pair of the second signal detector group including the plurality of first signal detectors arranged at the same distance in the same direction with respect to the respective signal detectors of the first signal detector group and arranged along the detection direction and the fourth signal detector group including the second signal detectors arranged at the same distance in a direction different from the same direction with respect to the respective signal detectors of the second signal detector group, the reliability determination value for determining reliability of the first focus control performed using the detection signals of the respective signal detectors of the first pair and the second pair,
wherein in a video mode where focusing is continued with respect to a main subject, the focus control determinator causes the reliability determination value generator to generate the reliability determination value after the second focus control is terminated, and performs, in the case where the reliability of the first focus control based on the reliability determination value is smaller than a threshold value, the second focus control again.

14. The image capture device according to claim 2, further comprising:
a reliability determination value generator that generates, based on a ratio between an integrated value of detection signals of the first signal detectors and an integrated value of detections signals of the second signal detectors, output from the first pair of the first signal detector group including the plurality of first signal detectors arranged along the phase difference detection direction in the first signal detector and the second signal detector and the third signal detector group including the second signal detectors arranged at the same distance in the same direction with respect to the respective signal detectors of the first signal detector group, and based on a ratio between an integrated value of detection signals of the first signal detectors and an integrated value of detections signals of the second signal detectors, output from the second pair of the second signal detector group including the plurality of first signal detectors arranged at the same distance in the same direction with respect to the respective signal detectors of the first signal detector group and arranged along the detection direction and the fourth signal detector group including the second signal detectors arranged at the same distance in the direction different from the same direction with respect to the respective signal detectors of the second signal detector group, the reliability determination value for determining reliability of the first focus control performed using the detection signals of the respective signal detectors of the first pair and the second pair, wherein in a video mode where focusing is continued with respect to a main subject, the focus control determinator causes the reliability determination value generator to generate the reliability determination value after the second focus control is terminated, and performs, in the case where the reliability of the first focus control based on the reliability determination value is smaller than a threshold value, the second focus control again.

15. The image capture device according to claim 3, further comprising:

a reliability determination value generator that generates, based on a ratio between an integrated value of detection signals of the first signal detectors and an integrated value of detections signals of the second signal detectors, output from the first pair of the first signal detector group including the plurality of first signal detectors arranged along the phase difference detection direction in the first signal detector and the second signal detector and the third signal detector group including the second signal detectors arranged at the same distance in the same direction with respect to the respective signal detectors of the first signal detector group, and based on a ratio between an integrated value of detection signals of the first signal detectors and an integrated value of detections signals of the second signal detectors, output from the second pair of the second signal detectors group including the plurality of first signal detectors arranged at the same distance in the same direction with respect to the respective signal detectors of the first signal detector group and arranged along the detection direction and the fourth detector group including the second signal detectors arranged at the same distance in a direction different from the same direction with respect to the respective signal detectors of the second signal detector group, the reliability determination value for determining reliability of the first focus control performed using the detection signals of the respective signal detectors of the first pair and the second pair, wherein in a video mode where focusing is continued with respect to a main subject, the focus control determinator causes the reliability determination value generator to generate the reliability determination value after the second focus control is terminated, and performs, in the case where the reliability of the first focus control based on the reliability determination value is smaller than a threshold value, the second focus control again.

16. The image capture device according to claim 1, wherein the imaging element includes a plurality of signal detector pairs of the first signal detectors and the second signal detectors arranged in a direction that intersects the detection direction with respect to the first signal detectors, wherein the plurality of signal detector pairs include a first signal detector pair and a second signal detector pair in which positional relationships between the first signal detectors and the second signal detectors are reverse to each other, wherein the imaging element includes a plurality of pair lines in which the first signal detector pair and the second signal detector pair are alternately arranged in the detection direction, and wherein the information generator sets the first signal detector pair included in an arbitrary pair line as the first pair and sets the second signal detector pair included in the arbitrary pair line as the second pair, or sets, in a state where the signal detectors included in the arbitrary pair line are divided into two groups including the signal detectors disposed at the same position in a direction orthogonal to the detection direction, one group as the first pair and sets the other group as the second pair, to calculate the reliability determination value.

17. A focus control method in an image capture device that includes an imaging element that images a subject through an imaging optical system including a focus lens, the imaging element including a first signal detector that detects a signal based on one beam among a pair of beams that passes through different portions in a pupil region of the imaging optical system, and a second signal detector that detects a signal based on the other beam among the pair of beams, and the focus control method comprising:

a focus control step of performing any one of a first focus control for moving the focus lens to a focusing position determined based on detection signals of the first signal detector and the second signal detector and a second focus control for moving the focus lens along an optical axis direction by an arbitrary distance in a predetermined movement range and moving the focus lens to a focusing position determined based on contrast of images captured by the imaging element at respective movement positions;

a focus control determination step of determining which one of the first focus control and the second focus control is to be performed based on information generated using the detection signals of the first signal detector and the second signal detector;

a control step of variably controlling, in the case where it is determined that the second focus control is to be performed, at least the arbitrary distance, among the movement range and the arbitrary distance in the movement range, based on the information; and an information generation step of generating, based on correlation operation results between detection signals from the first signal detector and detection signals from the second signal detector, output from a first pair of a first signal detector group including a plurality of first signal detectors arranged along a phase difference detection direction in the first signal detector and the second signal detector and a third signal detector group including the second signal detectors arranged at the same distance in a direction orthogonal to the phase difference detection direction with respect to the respective signal detectors of the first signal detector group, and based on correlation operation results between detection signals from the first signal detector and detection signals from the second signal detector, output from a second pair of a second signal detector group including a plurality of first signal detectors arranged at the same distance in the same direction with respect to the respective signal detectors of the first signal detectors group and arranged along the detection direction and a fourth signal detectors group including the second signal detectors arranged at the same distance in a direction opposite to a direction orthogonal to the phase difference detection direction with respect to the respective signal detectors of the second signal detector group, a reliability determination value for determining reliability of the correlation operation results as the information, wherein in the focus control determination step, it is determined which one of the first focus control and the second focus control is to be performed according to the size of the reliability determination value, and wherein in the control step, in the case where it is determined that the second focus control is to be performed, a factor for the determination that the second focus control is to be performed is determined according to the size of the reliability determination value, and in the case where the factor is based on a frequency of a subject image, the arbitrary distance is reduced compared with a case where the factor is not based on the frequency of the subject image.

18. A focus control method in an image capture device that includes an imaging element that images a subject through an imaging optical system including a focus lens, the imaging element including a first signal detector that detects a signal based on one beam among a pair of beams that passes through different portions in a pupil region of the imaging optical system, and a second signal detector that detects a signal based on the other beam among the pair of beams, and the focus control method comprising:

a focus control step of performing any one of a first focus control for moving the focus lens to a focusing position determined based on detection signals of the first signal detector and the second signal detector and a second focus control for moving the focus lens along an optical axis direction by an arbitrary distance in a predetermined movement range and moving the focus lens to a focusing position determined based on contrast of images captured by the imaging element at respective movement positions;

a focus control determination step of determining which one of the first focus control and the second focus control is to be performed based on information generated using the detection signals of the first signal detector and the second signal detector;

a control step of variably controlling, in the case where it is determined that the second focus control is to be performed, at least the arbitrary distance, among the movement range and the arbitrary distance in the movement range, based on the information; and an information generation step of generating, based on a ratio between an integrated value of detection signals of the first signal detectors and an integrated value of detections signals of the second signal detectors, output from a first pair of a first signal detector group including a plurality of first signal detectors arranged along a phase difference detection direction in the first signal detector and the second signal detector and a third signal detector group including the second signal detectors arranged at the same distance in a direction orthogonal to the phase difference detection direction with respect to the respective signal detectors of the first signal detector group, and based on a ratio between an integrated value of detection signals of the first signal detectors and an integrated value of detections signals of the second signal detectors, output from a second pair of a second signal detector group including the plurality of first signal detectors arranged at the same distance in the same direction with respect to the respective signal detectors of the first signal detector group and arranged along the detection direction and a signal detector group including the second signal detectors arranged at the same distance in a direction opposite to a direction orthogonal to the phase difference detection direction with respect to the respective signal detectors of the second signal detector group, a reliability determination value for determining reliability of the first focus control performed using the detection signals of the respective signal detectors of the first pair and the second pair as the information.

* * * * *